(12) United States Patent
Sakakibara et al.

(10) Patent No.: US 10,277,848 B2
(45) Date of Patent: Apr. 30, 2019

(54) SOLID-STATE IMAGING DEVICE, METHOD OF DRIVING THE SAME, AND ELECTRONIC APPARATUS

(71) Applicant: SONY CORPORATION, Tokyo (JP)

(72) Inventors: Masaki Sakakibara, Kanagawa (JP); Yorito Sakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/540,384

(22) PCT Filed: Jan. 4, 2016

(86) PCT No.: PCT/JP2016/050014
§ 371 (c)(1),
(2) Date: Jun. 28, 2017

(87) PCT Pub. No.: WO2016/114153
PCT Pub. Date: Jul. 21, 2016

(65) Prior Publication Data
US 2017/0353683 A1 Dec. 7, 2017

(30) Foreign Application Priority Data

Jan. 13, 2015 (JP) .................................. 2015-004097

(51) Int. Cl.
*H04N 5/357* (2011.01)
*H04N 5/363* (2011.01)
(Continued)

(52) U.S. Cl.
CPC ........... *H04N 5/374* (2013.01); *H04N 5/3575* (2013.01); *H04N 5/363* (2013.01); *H04N 5/378* (2013.01); *H04N 5/3745* (2013.01)

(58) Field of Classification Search
CPC ...... H04N 5/3575; H04N 5/363; H04N 5/374; H04N 5/3745; H04N 5/378
See application file for complete search history.

(56) References Cited

U.S. PATENT DOCUMENTS

| 7,719,583 B1* | 5/2010 | Lee .................. H04N 3/155 348/294 |
| 7,847,846 B1* | 12/2010 | Ignjatovic .............. H04N 5/378 250/208.1 |

(Continued)

FOREIGN PATENT DOCUMENTS

| JP | 2005-127835 A | 5/2005 |
| JP | 2011-142590 A | 7/2011 |
| JP | 2014-220559 A | 11/2014 |

OTHER PUBLICATIONS

International Search Report prepared by the Japan Patent Office dated Feb. 16, 2016, for International Application No. PCT/JP2016/050014.

(Continued)

*Primary Examiner* — Amy R Hsu
(74) *Attorney, Agent, or Firm* — Sheridan Ross P.C.

(57) ABSTRACT

The present technology relates to a solid-state imaging device, a method of driving the solid-state imaging device, and an electronic apparatus by which pixels can be read effectively. The solid-state imaging device includes a readout unit that performs a common-source operation or a source follower operation with respect to pixels to read a signal for each column. According to a level of illumination, the readout unit performs a common-source readout operation to reset a floating diffusion region and read an electric charge transferred from a photoelectric transducer and held in the floating diffusion region, and performs a source follower readout operation to reset the floating diffusion region and read the electric charge transferred from the photoelectric transducer and held in the floating diffusion region. The present technology is applicable to a solid-state imaging device such as a CMOS image sensor.

15 Claims, 22 Drawing Sheets

(51) Int. Cl.
    *H04N 5/374*     (2011.01)
    *H04N 5/378*     (2011.01)
    *H04N 5/3745*    (2011.01)

(56) References Cited

U.S. PATENT DOCUMENTS

| | | | |
|---|---|---|---|
| 8,217,433 B1* | 7/2012 | Fife | G01N 27/4145 257/253 |
| 9,991,298 B1* | 6/2018 | Mo | H01L 27/14612 |
| 2002/0093581 A1* | 7/2002 | Ikeda | H04N 5/357 348/302 |
| 2002/0121589 A1* | 9/2002 | Guidash | H04N 5/3559 250/208.1 |
| 2005/0068436 A1* | 3/2005 | Fraenkel | H04N 5/2178 348/294 |
| 2005/0128327 A1* | 6/2005 | Bencuya | H01L 27/14603 348/308 |
| 2008/0135895 A1* | 6/2008 | Lee | H04N 3/155 257/290 |
| 2016/0006956 A1* | 1/2016 | Sakai | H04N 5/3575 250/208.1 |
| 2016/0028974 A1* | 1/2016 | Guidash | H04N 5/37455 348/294 |
| 2017/0230597 A1* | 8/2017 | Fahim | H04N 5/378 |

OTHER PUBLICATIONS

Yang et al., "A 3MPixel Low-Noise Flexible Architecture CMOS Image Sensor"; 2006 IEEE International Solid-State Circuits Conference, Session 27, Image Sensor, 27.3.

\* cited by examiner

SOLID-STATE IMAGING DEVICE, METHOD OF DRIVING THE SAME, AND ELECTRONIC APPARATUS

CROSS REFERENCE TO RELATED APPLICATIONS

This application is a national stage application under 35 U.S.C. 371 and claims the benefit of PCT Application No. PCT/JP2016/050014 having an international filing date of 4 Jan. 2016, which designated the United States, which PCT application claimed the benefit of Japanese Patent Application No. 2015-004097 filed 13 Jan. 2015, the disclosures of which are incorporated herein by reference in their entirety.

TECHNICAL FIELD

The present technology relates to a solid-state imaging device, a method of driving the solid-state imaging device, and an electronic apparatus, and more particularly to a solid-state imaging device, a method of driving the solid-state imaging device, and an electronic apparatus by which pixels can be read effectively.

BACKGROUND ART

Recent imaging devices such as video cameras and digital still cameras use complementary metal oxide semiconductor (CMOS) image sensors as image sensors to capture images.

This kind of image sensor reads an electric charge generated by a photodiode provided in each pixel to obtain a pixel signal from each pixel (refer to Non-Patent Document 1, for example). A technology disclosed in Non-Patent Document 1 employs a common-source amplifier configuration and uses gate-drain parasitic capacitance to read a pixel with high conversion efficiency.

CITATION LIST

Non-Patent Document

Non-Patent Document 1: J. Yang, et. al "A 3MPixel Low-Noise Flexible Architecture CMOS Image Sensor," 2006, ISSCC, Digest Tec papers, IEEE.

SUMMARY OF THE INVENTION

Problems to be Solved by the Invention

While a source follower configuration is known as a pixel readout circuit, there has been a demand for effectively reading a pixel by switching the operation between a common-source readout operation and a source follower readout operation.

The present technology has been made in view of such circumstances, and aims at effectively reading a pixel by switching the operation between the common-source readout operation and the source follower readout operation at the time of reading the pixel.

Solutions to Problems

A solid-state imaging device according to a first aspect of the present technology includes: a plurality of pixels each including: a photoelectric transducer that generates an electric charge according to an amount of incident light and accumulates the electric charge inside; one or a plurality of transfer gates that transfers the electric charge accumulated in the photoelectric transducer; and a floating diffusion region that holds the electric charge transferred by the transfer gates in order for the electric charge to be read as a signal; and a readout unit that performs a common-source operation or a source follower operation with respect to the plurality of pixels to read a signal for each column. According to a level of illumination, the readout unit performs a common-source readout operation to reset the floating diffusion region and read the electric charge transferred from the photoelectric transducer and held in the floating diffusion region, and performs a source follower readout operation to reset the floating diffusion region and read the electric charge transferred from the photoelectric transducer and held in the floating diffusion region.

According to the level of illumination, the solid-state imaging device of the first aspect of the present technology performs the common-source readout operation to reset the floating diffusion region and read the electric charge transferred from the photoelectric transducer and held in the floating diffusion region, or performs the source follower readout operation to reset the floating diffusion region and read the electric charge transferred from the photoelectric transducer and held in the floating diffusion region.

According to a second aspect of the present technology, there is provided a method of driving a solid-state imaging device that includes: a plurality of pixels each including: a photoelectric transducer that generates an electric charge according to an amount of incident light and accumulates the electric charge inside; one or a plurality of transfer gates that transfers the electric charge accumulated in the photoelectric transducer; and a floating diffusion region that holds the electric charge transferred by the transfer gates in order for the electric charge to be read as a signal; and a readout unit that performs a common-source operation or a source follower operation with respect to the plurality of pixels to read a signal for each column. The method includes a step in which the readout unit performs, according to a level of illumination, a common-source readout operation to reset the floating diffusion region and read the electric charge transferred from the photoelectric transducer and held in the floating diffusion region, and a source follower readout operation to reset the floating diffusion region and read the electric charge transferred from the photoelectric transducer and held in the floating diffusion region.

According to the level of illumination, the method of driving a solid-state imaging device according to the second aspect of the present technology performs the common-source readout operation to reset the floating diffusion region and read the electric charge transferred from the photoelectric transducer and held in the floating diffusion region, or performs the source follower readout operation to reset the floating diffusion region and read the electric charge transferred from the photoelectric transducer and held in the floating diffusion region.

According to a third aspect of the present technology, there is provided an electronic apparatus equipped with a solid-state imaging device that includes: a plurality of pixels each including: a photoelectric transducer that generates an electric charge according to an amount of incident light and accumulates the electric charge inside; one or a plurality of transfer gates that transfers the electric charge accumulated in the photoelectric transducer; and a floating diffusion region that holds the electric charge transferred by the transfer gates in order for the electric charge to be read as a signal; and a readout unit that performs a common-source operation or a source follower operation with respect to the plurality of pixels to read a signal for each column. According to a level of illumination, the readout unit performs a common-source readout operation to reset the floating diffusion region and read the electric charge transferred from the photoelectric transducer and held in the floating diffusion region, and performs a source follower readout operation to reset the floating diffusion region and read the electric charge transferred from the photoelectric transducer and held in the floating diffusion region.

According to the level of illumination, the electronic apparatus according to the third aspect of the present technology performs the common-source readout operation to reset the floating diffusion region and read the electric charge transferred from the photoelectric transducer and held in the floating diffusion region, or performs the source follower readout operation to reset the floating diffusion region and read the electric charge transferred from the photoelectric transducer and held in the floating diffusion region.

Effects of the Invention

The pixels can be read effectively according to the first to third aspects of the present technology.

Note that the present technology has an effect not necessarily limited to the one described herein, but may have any effect described in the present disclosure.

MODE FOR CARRYING OUT THE INVENTION

Figure 1:
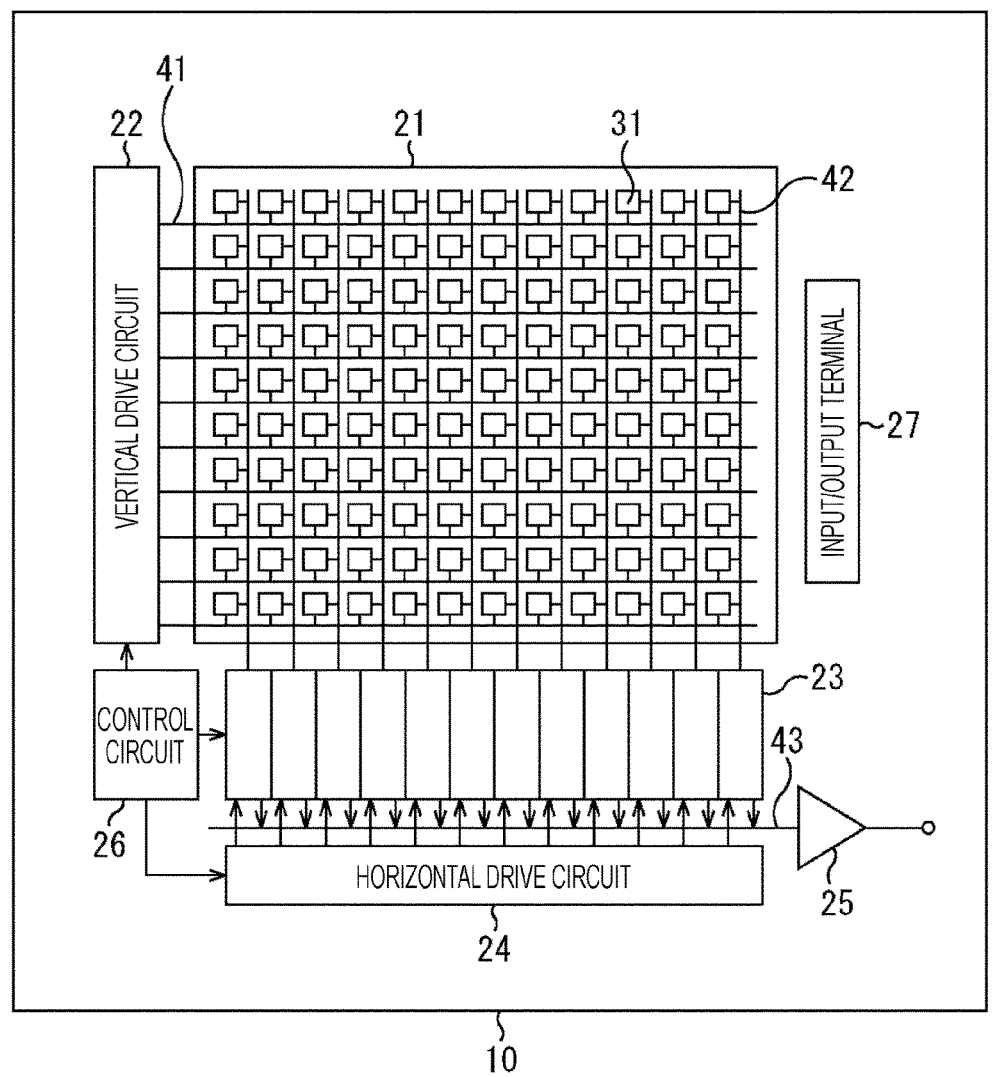
FIG. 1 is a diagram illustrating an example of the configuration of a solid-state imaging device.

Embodiments of the present technology will now be described with reference to the drawings. Note that the description will be made in the following order.

1. Configuration of solid-state imaging device
2. First embodiment: basic configuration
3. Second embodiment: configuration for adaptively switching operating mode by A/D converter circuit
4. Third embodiment: configuration in which LOFIC structure is provided within pixel
5. Fourth embodiment: configuration for adaptively switching three levels of conversion efficiency by A/D converter circuit
6. Configuration of camera module
7. Configuration of electronic apparatus
8. Example of use of solid-state imaging device 1. Configuration of Solid-State Imaging Device (Configuration of Solid-State Imaging Device)

FIG. 1 is a diagram illustrating an example of the configuration of a solid-state imaging device.

A solid-state imaging device 10 of FIG. 1 is an image sensor such as a complementary metal oxide semiconductor (CMOS) image sensor. The solid-state imaging device 10 takes in incident light (image light) from a subject through an optical lens system (not shown), converts the amount of incident light forming an image on an imaging surface into an electrical signal pixel by pixel, and outputs the signal as a pixel signal.

As illustrated in FIG. 1, the solid-state imaging device 10 includes a pixel array unit 21, a vertical drive circuit 22, a column signal processing circuit 23, a horizontal drive circuit 24, an output circuit 25, a control circuit 26, and an input/output terminal 27.

The pixel array unit 21 includes a plurality of pixels 31 arranged in two dimensions. Each of the pixels 31 includes a photodiode as a photoelectric transducer and a plurality of pixel transistors.

The vertical drive circuit 22 is formed of a shift register, for example, to select a predetermined pixel drive line 41, supply a pulse for driving the pixels 31 to the pixel drive line 41 being selected, and drive the pixels 31 by the row. In other words, the vertical drive circuit 22 selectively scans the pixels 31 in the pixel array unit 21 row by row in a vertical direction, and supplies a pixel signal based on a signal charge to the column signal processing circuit 23 through a vertical signal line 42, the signal charge being generated in accordance with the amount of light received by the photodiode in each pixel 31.

The column signal processing circuit 23 is arranged for each column of the pixels 31 and performs signal processing such noise removal on the signal output from the row of pixels 31 for each pixel column. For example, the column signal processing circuit 23 performs signal processing such as correlated double sampling (CDS) that removes fixed pattern noise specific to each pixel, and analog/digital (A/D) conversion.

The horizontal drive circuit 24 is formed of a shift register, for example, and successively outputs a horizontal scanning pulse to select the column signal processing circuits 23 in order and cause each of the column signal processing circuits 23 to output the pixel signal to a horizontal signal line 43.

The output circuit 25 performs signal processing on the signals successively supplied from the column signal processing circuits 23 through the horizontal signal line 43, and outputs the signals. Note that the output circuit 25 may only perform buffering or perform black level adjustment, column variation correction, or various types of digital signal processing, for example.

The control circuit 26 controls the operation of each unit in the solid-state imaging device 10. The control circuit 26 for example receives an input clock signal and data for instructing the operating mode or the like, and outputs data such as internal information of the solid-state imaging device 10. That is, on the basis of a vertical synchronizing signal, a horizontal synchronizing signal, and a master clock signal, the control circuit 26 generates a clock signal and a control signal on which the operations of the vertical drive circuit 22, the column signal processing circuit 23, and the horizontal drive circuit 24 are based. The control circuit 26 outputs the clock signal and the control signal being generated to the vertical drive circuit 22, the column signal processing circuit 23, and the horizontal drive circuit 24.

The input/output terminal 27 exchanges signals with the outside.

The solid-state imaging device 10 of FIG. 1 configured as described above is the CMOS image sensor employing what is called a column AD scheme in which the column signal processing circuit 23 performing the CDS processing and the A/D conversion processing is arranged for each pixel column.

2. First Embodiment (Configuration of Pixel-Column Signal Processing Circuit)

Figure 2:
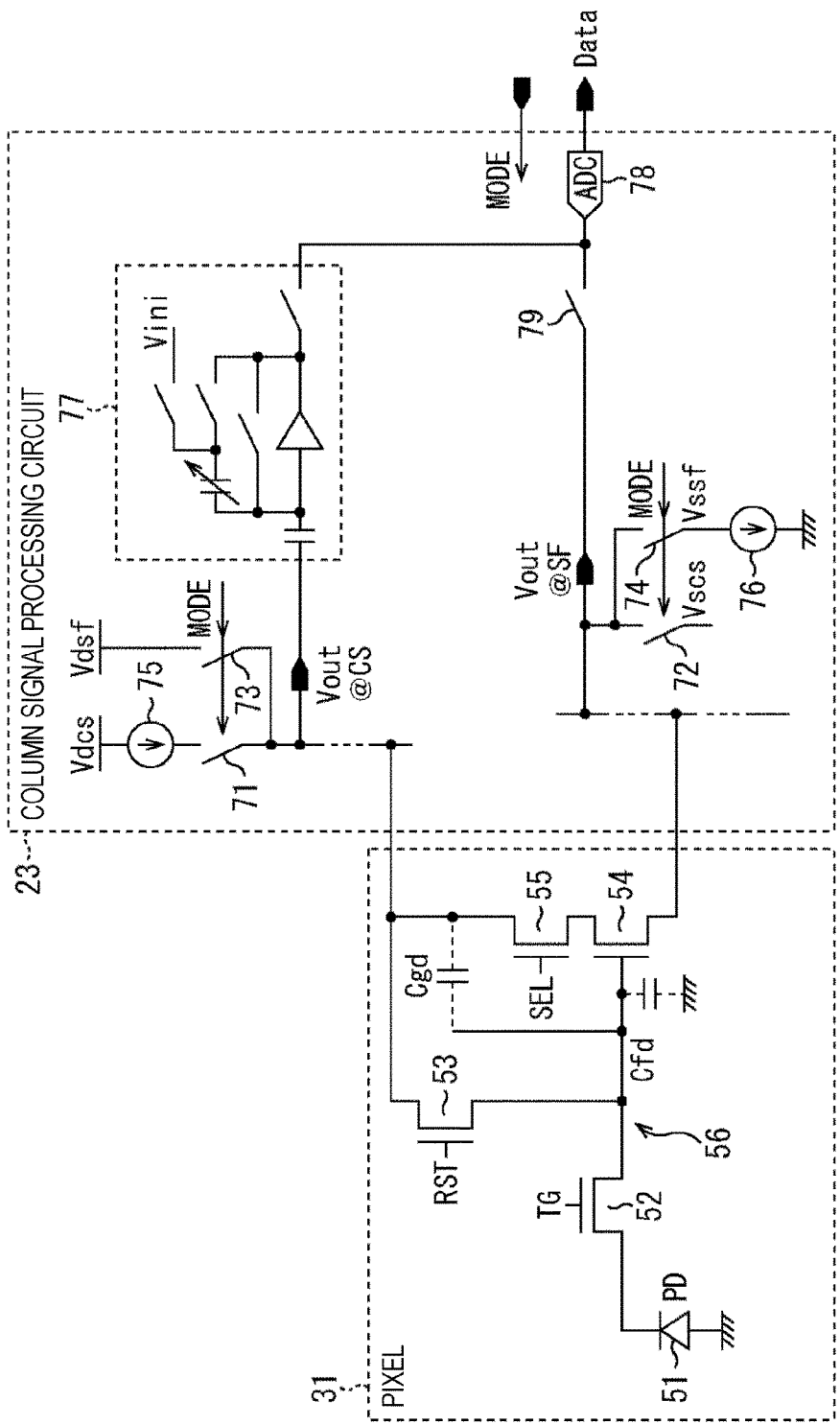
FIG. 2 is a diagram illustrating an example of the configuration of a pixel-column signal processing circuit according to a first embodiment.

FIG. 2 is a diagram illustrating the configuration of a pixel-column signal processing circuit according to a first embodiment. The pixel-column signal processing circuit includes the pixels 31 and the column signal processing circuit 23 of FIG. 1.

Note that in the following description, "high illumination" refers to a case where the level of illumination of a subject equals predetermined illumination or higher, namely where incident light is photoelectrically converted by the photoelectric transducer (a photodiode 51 in FIG. 2) into an amount of electric charge exceeding a predetermined amount of electric charge, whereas "low illumination" refers to a case where the level of illumination of the subject is lower than the predetermined illumination, namely where incident light is photoelectrically converted by the photoelectric transducer into an amount of electric charge equal to the predetermined amount of electric charge or lower.

The pixel 31 includes the photodiode 51 as the photoelectric transducer, for example, and includes four transistors for the single photodiode 51, the four transistors being a transfer transistor 52, a reset transistor 53, an amplifying transistor 54, and a selection transistor 55. Note that a plurality of the transfer transistors 52 can be provided depending on the configuration of the pixel 31.

The photodiode 51 performs photoelectric conversion on the incident light to obtain the amount of electric charge corresponding to the amount of incident light. The transfer transistor 52 is disposed between the photodiode 51 and a floating diffusion (FD) region 56. The transfer transistor 52 receives a drive pulse TG at a transfer gate thereof and transfers the electric charge obtained by photoelectric conversion in the photodiode 51 to the floating diffusion region 56. Moreover, the reset transistor 53 is connected to the floating diffusion region 56. The reset transistor 53 receives a reset pulse RST at a gate thereof and resets the potential of the floating diffusion region 56.

The floating diffusion region 56 is connected to a gate of the amplifying transistor 54. The amplifying transistor 54 is connected to the vertical signal line 42 (FIG. 1) via the selection transistor 55 to make up a common-source readout circuit or a source follower readout circuit with a readout current source provided outside the pixel 31.

Here, in a case where the pixel 31 of FIG. 2 is selected from among the plurality of pixels connected to the vertical signal line 42 (FIG. 1), a selection pulse SEL is applied to a gate of the selection transistor 55, which is turned on to connect the amplifying transistor 54 to the vertical signal line 42 (FIG. 1). The amplifying transistor 54 amplifies the potential of the floating diffusion region 56 and outputs a voltage corresponding to the potential as a pixel signal to the column signal processing circuit 23 through the vertical signal line 42 (FIG. 1).

In pixel readout, the reset transistor 53 is turned on to reset the floating diffusion region 56 and output a voltage of the floating diffusion region 56 at that time through the amplifying transistor 54. The output at that time is a reset level output (P phase output). Moreover, the transfer transistor 52 is turned on to transfer the electric charge accumulated in the photodiode 51 to the floating diffusion region 56, and output a voltage of the floating diffusion region 56 at that time through the amplifying transistor 54. The output at that time is a signal level output (D phase output).

A CDS operation is then performed on the basis of a difference between the signal level output (D phase output) and the reset level output (P phase output) to obtain a net signal being read from the pixel 31. These operations can be performed simultaneously on a single row of the pixels since the gates of the transfer transistor 52, the reset transistor 53, and the selection transistor 55 are connected by the row.

The column signal processing circuit 23 includes a switch 71, a switch 72, a switch 73, a switch 74, a current source 75, a current source 76, an inverting amplifier circuit 77, an A/D converter circuit (also referred to as an analog/digital converter or ADC) 78, and a switch 79.

In the column signal processing circuit 23, the switch 71 is connected to a power supply Vdcs via the current source 75, and the switch 72 is connected to a reference potential Vscs. The switches 71 and 72 receive an H level or L level mode control signal (MODE) from the outside to perform a switching operation in conjunction with each other. Moreover, in the column signal processing circuit 23, the switch 73 is connected to a power supply Vdsf, and the switch 74 is connected to a reference potential Vssf via the current source 76. The switches 73 and 74 receive an H level or L level mode control signal (MODE) from the outside to perform a switching operation in conjunction with each other.

That is, in performing a common-source readout operation with the level of illumination of the subject being lower than the predetermined illumination to correspond to low illumination, for example, the switches 71 and 72 receive the H level mode control signal to be turned on, while the switches 73 and 74 receive the L level mode control signal to be turned off.

Figure 3:
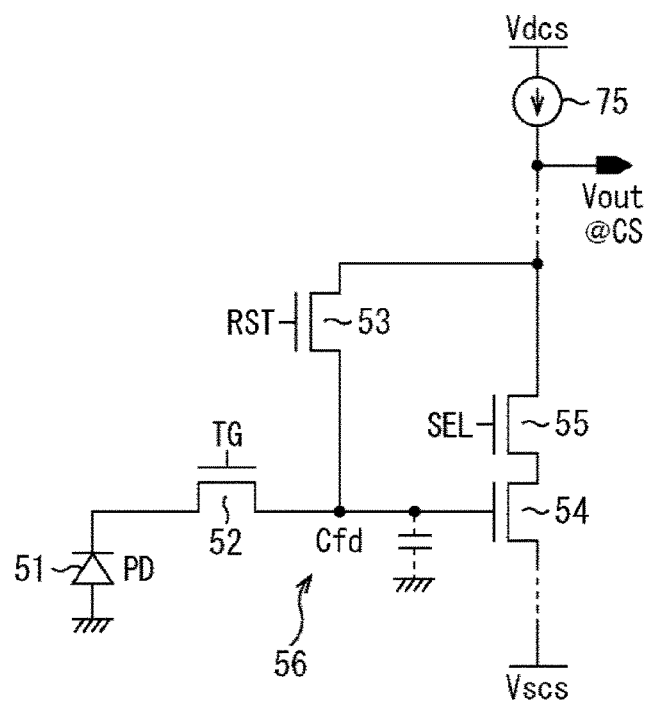
FIG. 3 is a diagram illustrating the configuration of a common-source readout circuit.

Such control of the mode control signal connects a drain side of the pixel 31 to the power supply Vdcs via the current source 75 and a source side of the pixel to the reference potential Vscs as illustrated in FIG. 3, thereby forming a common-source readout circuit and enabling the common-source readout operation. In the common-source readout operation, a signal (pixel signal) being read from the pixel 31 is output from a common source (CS) output side (indicated by Vout@CS in the figure).

Figure 4:
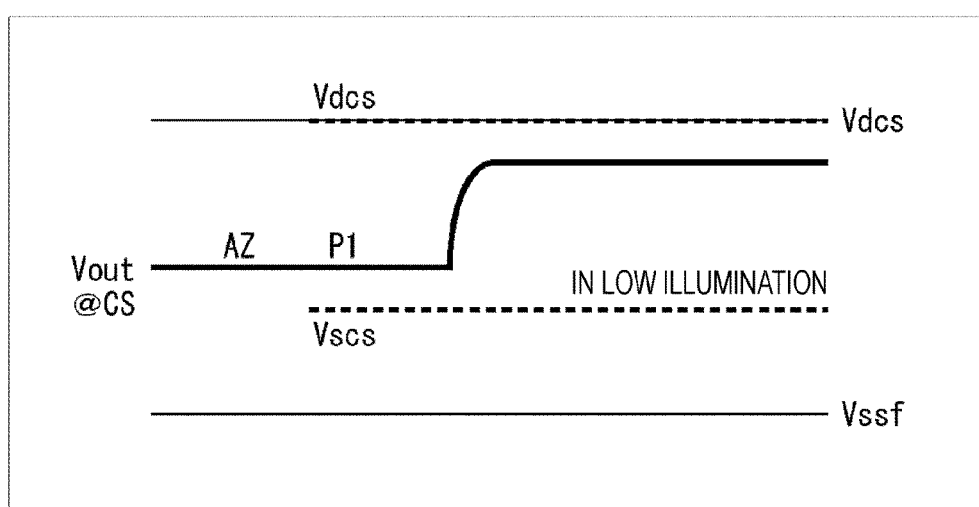
FIG. 4 is a timing waveform diagram of a signal read by a common-source readout operation.

FIG. 4 illustrates the waveform of the signal being read by the common-source readout operation performed in low illumination. Note that in FIG. 4 or the like, auto zero (AZ) indicates initialization performed to determine an operating point for each column at the start of the operation of a comparator in the A/D converter circuit 78. That is, in the common-source readout operation, the reset transistor 53 is turned on to reset the floating diffusion region 56 and output a reset level (P1) for the common source through the amplifying transistor 54. The transfer transistor 52 is thereafter turned on to transfer the electric charge accumulated in the photodiode 51 to the floating diffusion region 56, a voltage of which is then output as a signal level (D1) for the common source through the amplifying transistor 54.

As described above, the pixel-column signal processing circuit performs the common-source readout operation in a case where the subject is in low illumination to be able to read the signal (pixel signal) from the pixel 31 with high conversion efficiency (high gain) while using the gate-drain parasitic capacitance of the amplifying transistor 54 in the pixel 31.

On the other hand, in performing a source follower readout operation with the level of illumination of the subject being higher than or equal to the predetermined illumination to correspond to high illumination, for example, the switches 73 and 74 receive the H level mode control signal to be turned on, while the switches 71 and 72 receive the L level mode control signal to be turned off.

Figure 5:
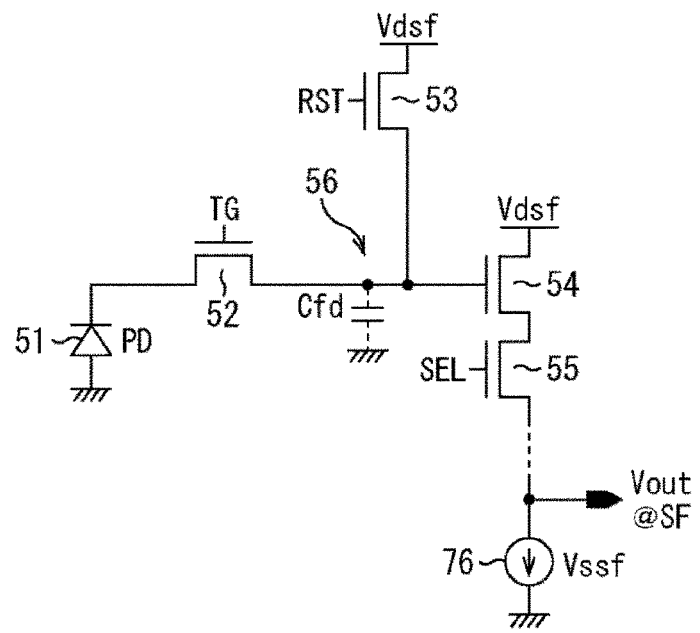
FIG. 5 is a diagram illustrating the configuration of a source follower readout circuit.

Such control of the mode control signal connects the drain side of the pixel 31 to the power supply Vdsf and the source side of the pixel to the reference potential Vssf via the current source 76 as illustrated in FIG. 5, thereby forming a source follower readout circuit and enabling the source follower readout operation. In the source follower readout operation, a signal (pixel signal) being read from the pixel 31 is output from a source follower (SF) output side (indicated by Vout@SF in the figure).

Figure 6:
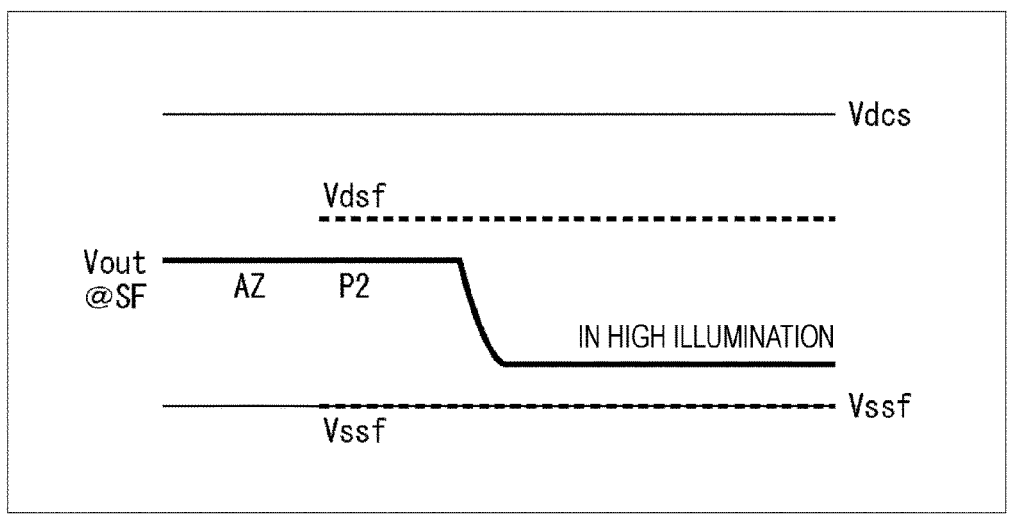
FIG. 6 is a timing waveform diagram of a signal read by a source follower readout operation.

FIG. 6 illustrates the waveform of the signal being read in the source follower readout operation performed in high illumination. That is, in the source follower readout operation, the reset transistor 53 is turned on to reset the floating diffusion region 56 and output a reset level (P2) for the source follower through the amplifying transistor 54. The transfer transistor 52 is thereafter turned on to transfer the electric charge accumulated in the photodiode 51 to the floating diffusion region 56, a voltage of which is then output as a signal level (D2) for the source follower through the amplifying transistor 54.

As described above, the pixel-column signal processing circuit performs the source follower readout operation in a case where the subject is in high illumination to be able to read the signal (pixel signal) from the pixel 31 with lower conversion efficiency (lower gain) than in a case where the common-source readout operation is performed in low illumination.

Referring back to the description of FIG. 2, the inverting amplifier circuit 77 receives the signal output from the CS output side (indicated by Vout@CS in the figure) in a case where the common-source readout operation is performed in low illumination. The inverting amplifier circuit 77 performs signal processing such as inverting amplification on the signal read from the pixel 31 and supplied from the CS output side, and supplies the signal to the A/D converter circuit 78. Note that the configuration of the inverting amplifier circuit 77 and a method of driving the amplifier will be described later in detail with reference to FIGS. 7 to 10.

The A/D converter circuit 78 receives the output (signal) from the inverting amplifier circuit 77 in a case where the common-source readout operation is performed in low illumination, or receives the output (signal) read from the pixel 31 and supplied from the SF output side (Vout@SF) in a case where the source follower readout operation is performed in high illumination. Note that the switch 79 is turned on in a case where the source follower readout operation is performed.

The A/D converter circuit 78 is a slope analog-to-digital converter that converts an analog pixel signal into a digital signal. That is, the A/D converter circuit 78 receives a reference signal from a reference signal generator (also referred to as a digital analog converter or DAC) and, with a clock signal starting to be counted, compares an analog pixel signal being input with the reference signal and keeps counting until the comparison results in a match to perform A/D conversion. Note that the configuration of the A/D converter circuit 78 and a method of driving the converter will be described later in detail with reference to FIGS. 11 and 12.

As has been described, the pixel-column signal processing circuit of FIG. 2 can switch the operating mode to the common-source readout operation or the source follower readout operation according to the level of illumination of the subject, for example. Moreover, the pixel-column signal processing circuit of FIG. 2 is provided with one or more of the transfer transistors 52 in the pixel 31 to be able to acquire the reset level (P) by resetting the floating diffusion region 56 with the reset transistor 53 and then acquire the signal level (D) by transferring the electric charge accumulated in the photodiode 51 to the floating diffusion region 56, whereby the CDS can be performed. Note that the pixel configured as described in Non-Patent Document 1 does not include a transfer transistor and thus cannot perform the CDS by which noise can be removed reliably.

(Detailed Configuration of Inverting Amplifier Circuit)

Now, in the pixel-column signal processing circuit of FIG. 2 with the pixel 31 having an operational amplifier configuration, the signal read by the common-source readout operation in low illumination has a low signal voltage as illustrated by the signal waveform in FIG. 4, whereas the signal read by the source follower readout operation in high illumination has a high signal voltage as illustrated by the signal waveform in FIG. 6. Moreover, as is apparent from the signal waveforms illustrated in FIGS. 4 and 6, the output (signal) of the common-source readout operation performed in low illumination and the output (signal) of the source follower readout operation performed in high illumination are input to the subsequent A/D converter circuit 78 in opposite directions. Furthermore, the signals output from the common-source readout operation performed in low illumination and the source follower readout operation performed in high illumination have a narrow dynamic range as signals swinging up and down are acquired in the operations.

Accordingly, in the pixel-column signal processing circuit of FIG. 2, the inverting amplifier circuit 77 is provided upstream of the A/D converter circuit 78 to shift the voltage range of the common-source readout operation performed in low illumination in accordance with the voltage range of the source follower readout operation performed in high illumination, and thus align the reset level of the common-source readout operation with the reset level of the source follower readout operation. The inverting amplifier circuit 77 further inverts the output (signal) of the common-source readout operation performed in low illumination, thereby aligning the output (signal) of the common-source readout operation performed in low illumination and the output (signal) of the source follower readout operation performed in high illumination to be input to the A/D converter circuit 78 in the same direction.

Such inverting amplifier circuit 77 enables readout with high conversion efficiency by the common-source readout operation performed in low illumination as well as reduces input referred noise by the effect of a gain amplifier. Moreover, the output (signal) of the common-source read operation is directed in the same direction as the output (signal) of the source follower readout operation performed in high illumination to fall in the optimum range for A/D conversion performed by the subsequent A/D converter circuit 78. The A/D converter circuit 78 thus need not be provided with a special adjustment mechanism. Moreover, the voltage range is shifted at the time of low illumination to align the reset level for the common source with the reset level for the source follower and thus be able to have a high dynamic range by reading the two levels in continuous, non-destructive manners.

Figure 7:
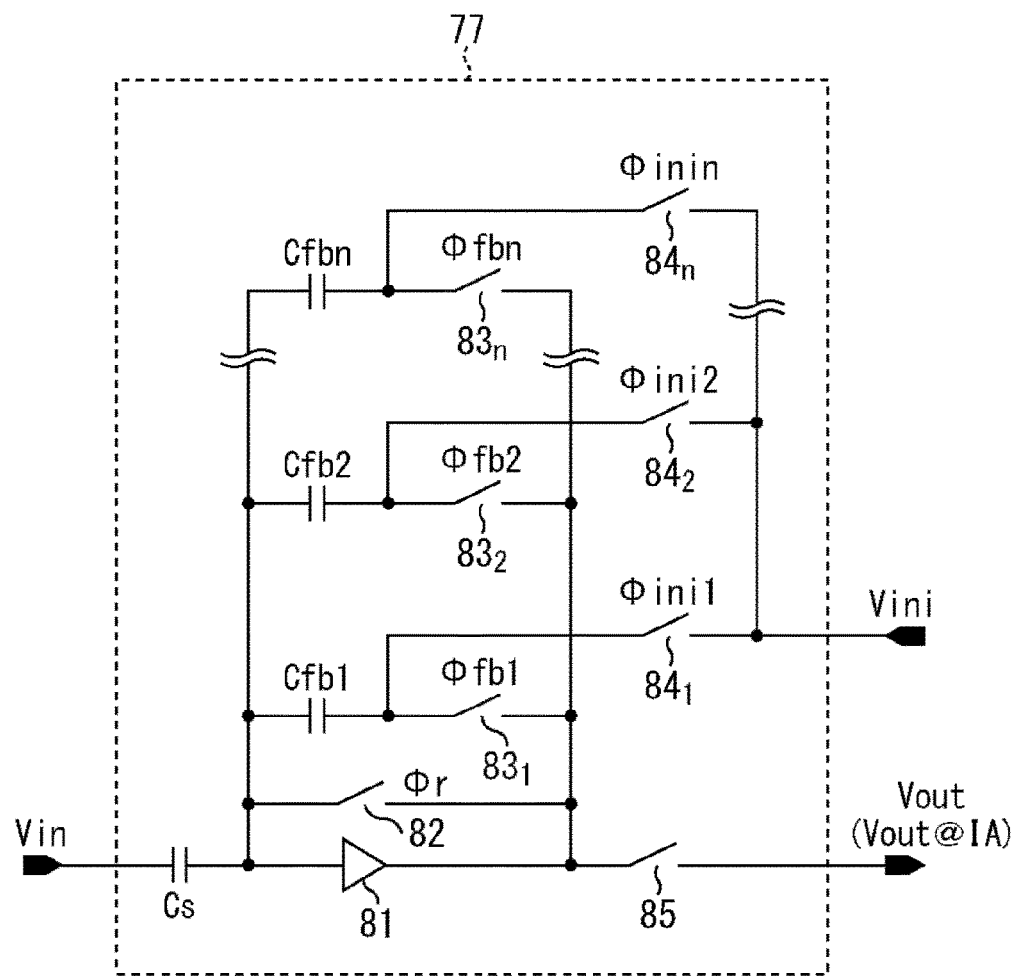
FIG. 7 is a diagram illustrating the configuration of an inverting amplifier circuit.

FIG. 7 is a diagram illustrating a detailed configuration of the inverting amplifier circuit 77 illustrated in FIG. 2. Note that the description will be made while referring to a timing diagram of FIG. 8 as appropriate since the timing diagram illustrates an example of how the inverting amplifier circuit 77 is driven.

The inverting amplifier circuit 77 in FIG. 7 adopts a switched capacitor configuration in which an operation is performed on the basis of a ratio between the capacitance of an input signal and the capacitance of an output signal. The ratio between the capacitance of the input signal and the capacitance of the output signal is controlled in a case where switches $83_1$ to $83_n$ and switches $84_1$ to $84_n$ are turned on or off by control signals Φfb1 to Φfbn and control signals Φini1 to Φinin, respectively. Also provided are a capacitor Cs on an input side (Vin), and capacitors Cfb1 to Cfbn corresponding to the switches 83 and 84. Note that n is an integer of one or more. Moreover, a switch 85 is in an on state during the common-source readout operation.

Figure 8:
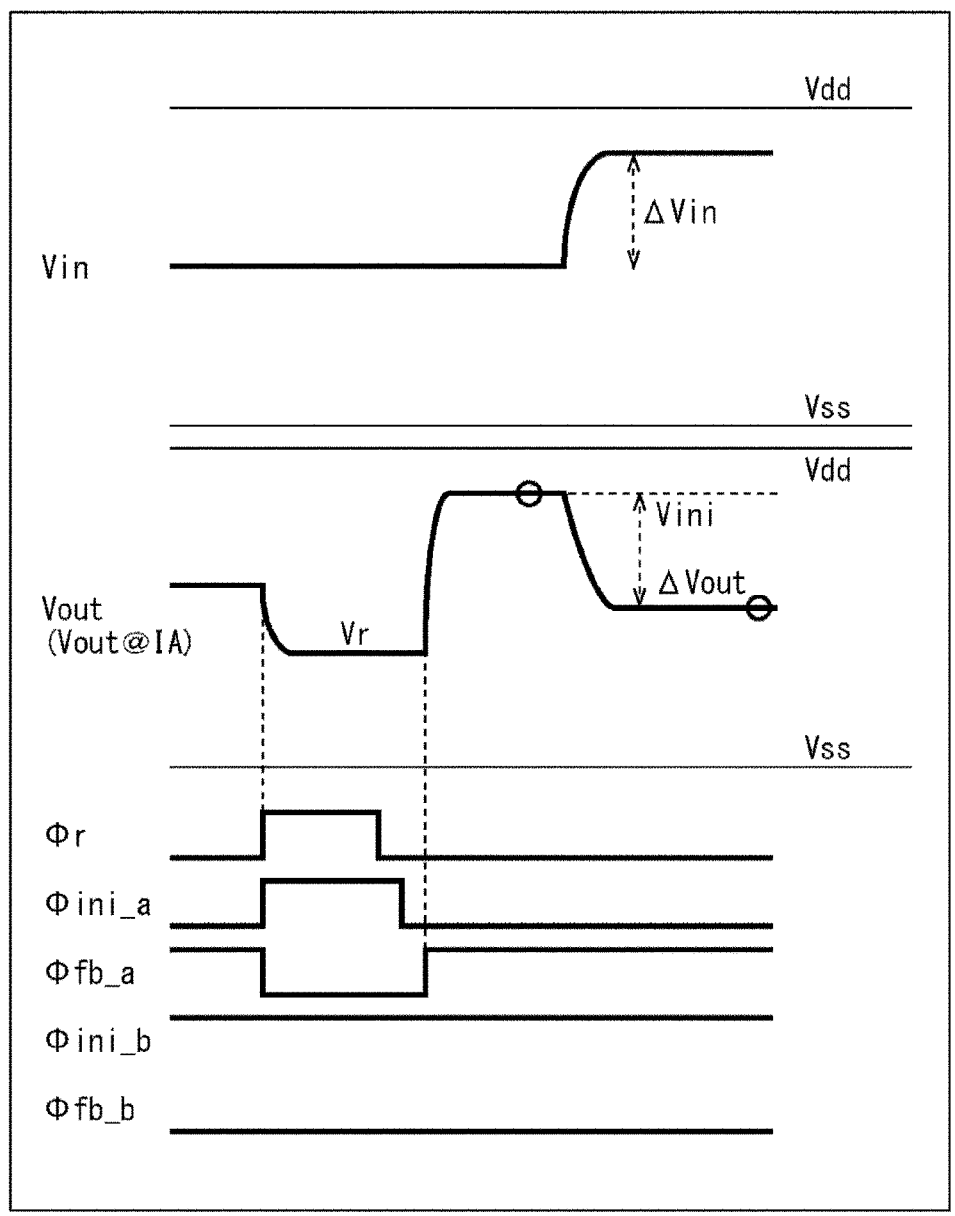
FIG. 8 is a timing diagram illustrating an example of how the inverting amplifier circuit is driven.

First, the input and output of an operational amplifier 81 is short circuited by inputting a control signal Φr to a switch 82 to obtain an initial voltage. A short circuit voltage Vr is output from output Vout (Vout@IA) at this time. Here, the control signal Φfb for the switch 83 corresponds to the control waveform of a control signal Φfb_a or Φfb_b in FIG. 8, and the control signal Φini for the switch 84 corresponds to the control waveform of a control signal Φini_a or Φini_b in FIG. 8. That is, the switches 83 and 84 receiving input of the control waveforms of the control signals Φfb_a and Φini_a of FIG. 8 are subjected to parallel control, where the ratio between the capacitance of the input signal and the capacitance of the output signal is determined according to the number of the switches controlled. On the other hand, the switches 83 and 84 receiving input of the control waveforms of the control signals Φfb_b and Φini_b of FIG. 8 are subjected to fixed control, where the capacitance is unused.

At this time, the switches 82 and 84 are turned off by the control signals Φr and Φini, and the switch 83 is turned on by the control signal Φfb. An initial voltage Vini is output from the output Vout (Vout@IA) at this point. This corresponds to the reset level (P1) of the common-source readout operation. The transfer transistor 52 is thereafter turned on to transfer the electric charge accumulated in the photodiode 51 to the floating diffusion region 56, and with the input Vin swinging to the side of Vdd, a differential signal that is gain-multiplied by the ratio between the capacitance of the input signal and the capacitance of the output signal swings to the side of Vss relative to the initial voltage Vini at the output Vout (Vout@IA). The output at this time is expressed by the following expression (1).

[Mathematical Formula 1]

$$\Delta Vout = Cs/\Sigma Cfb \times Vin \qquad (1)$$

The relationship expressed by the following expression (2) is also satisfied at this time.

[Mathematical Formula 2]

$$Vout = Vini - Cs/\Sigma Cfb \times \Delta Vin \qquad (2)$$

Note that in expressions (1) and (2), ΔVin represents a difference between the reset level (P1) and the signal level (D1) at the time of the common-source readout operation.

Note that the voltage value of the short circuit voltage Vr is desirably close to the voltage value of DARK output at the time of the source follower readout operation. This allows the subsequent A/D converter circuit 78 to recognize the input of the common-source readout operation and the input of the source follower readout operation as the same input, thereby saving the need for changing the operating range in accordance with the operating mode or providing a special adjustment mechanism on the side of the A/D converter circuit 78 to align the operating range.

Figure 9:
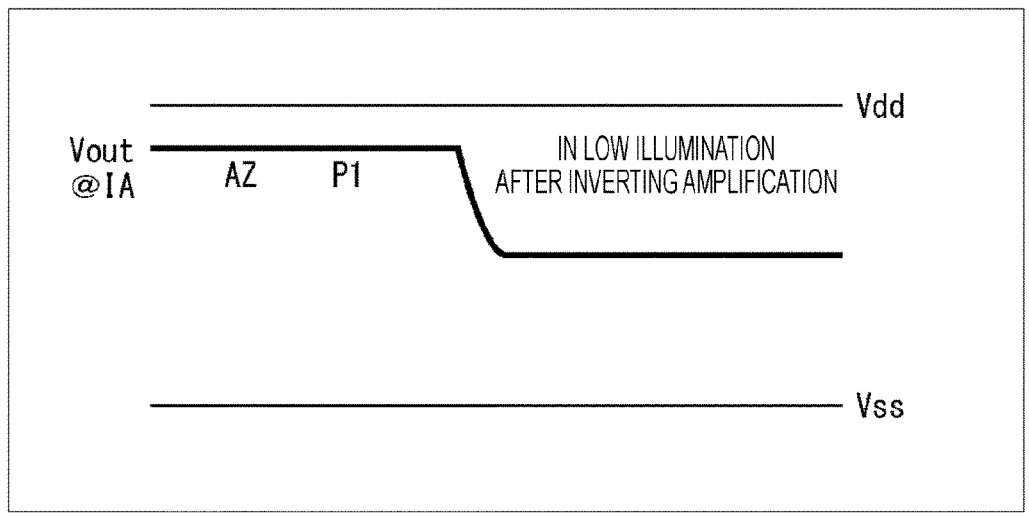
FIG. 9 is a timing waveform diagram of a signal read by the common-source readout operation in a case where the inverting amplifier circuit is provided.

In a case where the inverting amplifier circuit 77 is provided upstream of the A/D converter circuit 78 as described above, the output (signal) of the common-source readout operation performed in low illumination has the waveform as illustrated in FIG. 9. That is, the signal waveform in FIG. 4 corresponds to the waveform of the signal input to the inverting amplifier circuit 77, and the signal waveform in FIG. 9 corresponds to the waveform of the signal output from the inverting amplifier circuit 77. Moreover, for the purpose of comparison, FIG. 10 illustrates the waveform of the output (signal) of the source follower readout operation performed in high illumination.

Figure 10:
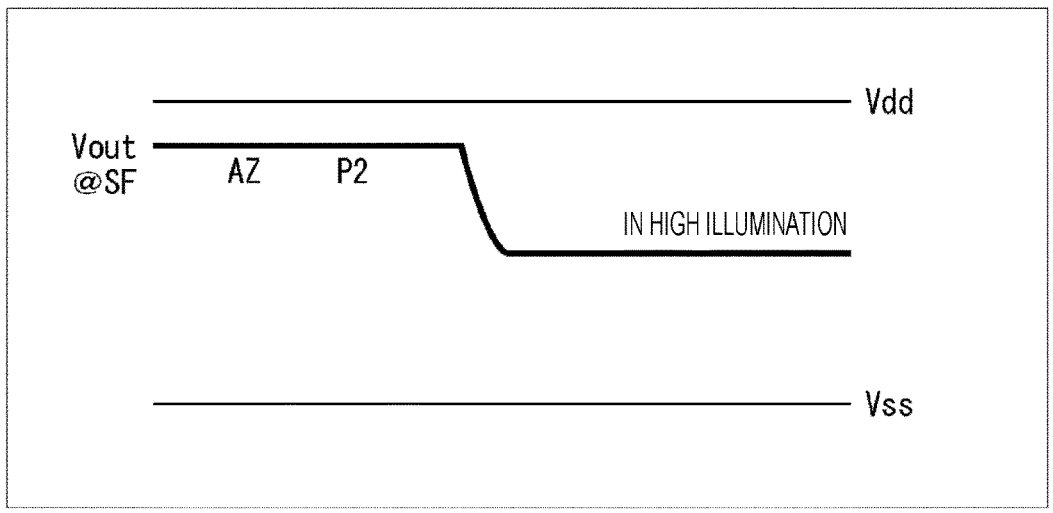
FIG. 10 is a timing waveform diagram of a signal read by the source follower readout operation in a case where the inverting amplifier circuit is provided.

In other words, as is apparent from the comparison between the signal waveform in FIG. 9 and the signal waveform in FIG. 10, the output (signal) of the common-source readout operation performed in low illumination is inverted by the inverting amplifier circuit 77 to be input to the A/D converter circuit 78 in the same direction as the direction of the output (signal) of the source follower readout operation performed in high illumination. Moreover, the voltage range of the common-source readout operation performed in low illumination is shifted in accordance with the voltage range of the source follower readout operation, so that the reset level (P1) of the common-source readout operation performed in low illumination is shifted in the direction of the reset level (P2) of the source follower readout operation performed in high illumination and that the reset levels are aligned.

The inverting amplifier circuit 77 is provided on the output side (Vout@CS) of the common-source readout operation performed in low illumination as described above to be able to output a signal favorable for the subsequent A/D converter circuit 78. As a result, the A/D converter circuit 78 does not require a special adjustment mechanism to adjust the operating point or reverse the direction of the slope. The dynamic range of the output signal can also be wider than in a case where the inverting amplifier circuit 77 is not provided.

(Detailed Configuration of A/D Converter Circuit)

Figure 11:
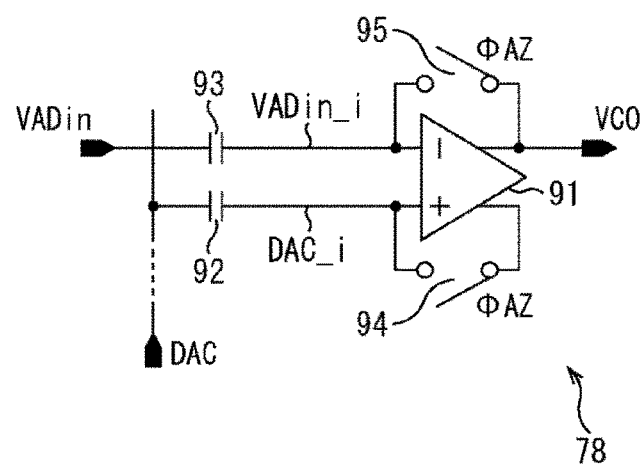
FIG. 11 is a diagram illustrating the configuration of an A/D converter circuit.
Figure 12:
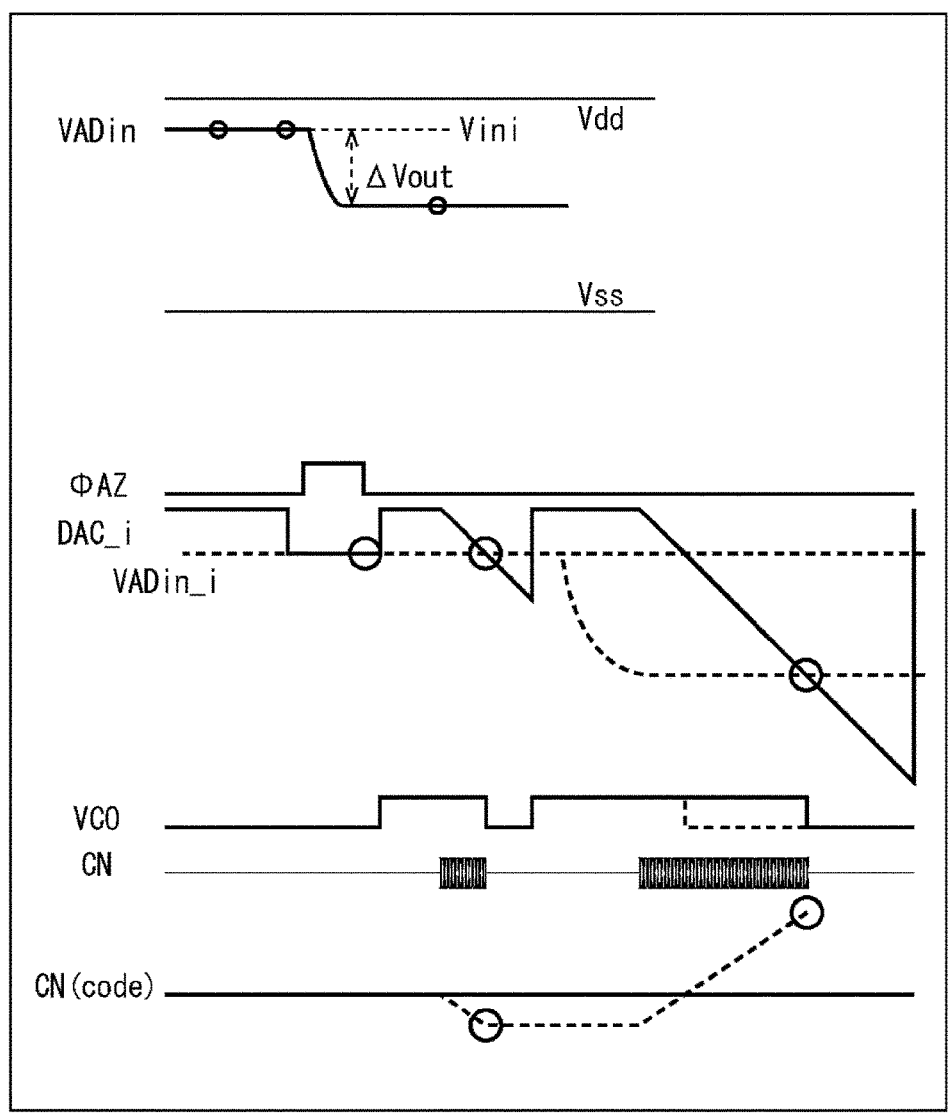
FIG. 12 is a timing diagram illustrating an example of how the A/D converter circuit is driven.

FIG. 11 is a diagram illustrating a detailed configuration of the A/D converter circuit 78 illustrated in FIG. 2. Note that the description will be made while referring to a timing diagram of FIG. 12 as appropriate since it illustrates an example of how the A/D converter circuit 78 is driven.

The A/D converter circuit 78 of FIG. 11 is a slope analog-to-digital converter. A reference signal DAC_i generated by the reference signal generator (DAC) and having a slope waveform (staircase waveform) is input to one input terminal (+) of a comparator 91 in the A/D converter circuit 78 through a DC-cutting capacitor 92. Moreover, a signal VADin_i read from the pixel 31 is input to another input terminal (−) of the comparator 91 through the vertical signal line 42 (FIG. 1) and a DC-cutting capacitor 93. That is, the output (signal) read from the pixel 31 is input through the inverting amplifier circuit 77 as the signal VADin_i in a case where the common-source readout operation is performed in low illumination, whereas the output (signal) read from the pixel 31 is input directly as the signal VADin_i in a case where the source follower readout operation is performed in high illumination.

The comparator 91 performs AZ by inputting a control signal ΦAZ to each of switches 94 and 95. The comparator 91 compares the reference signal DAC_i with the signal VADin_i to invert VCO at a point of intersection of the reference signal DAC_i and the signal VADin_i, and control a counter connected downstream. Note that a circle "○" in FIG. 12 indicates a point at which the two inputs of the comparator 91 correspond with each other. Then, the counter on the downstream side counts down the P phase and counts up the D phase in response to the output from the comparator 91 to perform A/D conversion. Note that the P phase may occur in succession in a case where the configuration of the pixel-column signal processing circuit according to the present technology is adopted, in which case the reset level (P) being acquired may be temporarily saved in a memory to determine which of the reset levels (P) saved in the memory is to be brought back in accordance with a result of determination on the signal level.

(Switching of Operating Mode)

The operating mode is switched to the common-source readout operation performed in low illumination or to the source follower readout operation performed in high illumination by using the mode control signal (MODE) as described above, where the mode control signal is set as follows, for example. That is, the mode control signal corresponding to the common-source readout operation is set in a case where the signal read by the source follower readout operation in a preceding frame does not reach a predetermined output (signal), whereby the operating mode is switched from the source follower readout operation to the common-source readout operation. In other words, the operating mode is determined on the basis of a frame acquired temporally before a current frame.

When the output (signal) is thereafter saturated in the common-source readout operation, the gain of the inverting amplifier circuit 77 is adjusted from a next frame to reduce the value of the signal. Further, the mode control signal corresponding to the source follower readout operation is set in a case where the saturation signal is still output after adjusting the gain value of the inverting amplifier circuit 77, whereby the operating mode is switched from the common-source readout operation to the source follower readout operation. Such an automatic determination system allows the pixel-column signal processing circuit of FIG. 2 to perform the common-source readout operation in low illumination and the source follower readout operation in high illumination.

Note that although the pixel-column signal processing circuit of FIG. 2 receives the mode control signal (MODE) from the outside in the aforementioned example, the control circuit 26 (FIG. 1) can in this case perform the aforementioned determination processing to supply the mode control signal (MODE) corresponding to a result of the determination processing to the switches 71 to 74, for example. Alternatively, the operating mode may be set at will by a user through a setting screen, an operation button, or the like instead of the automatic determination system.

The operating modes may also be switched alternately and successively in a fixed manner. Such fixed switching can be performed by a drive method which alternately and successively switches the operating modes in a horizontal or vertical direction, and a drive method which alternately and successively switches the operating modes frame by frame.

(Drive Method for Alternately and Successively Switching Operating Modes in Horizontal Direction)

Figure 13:
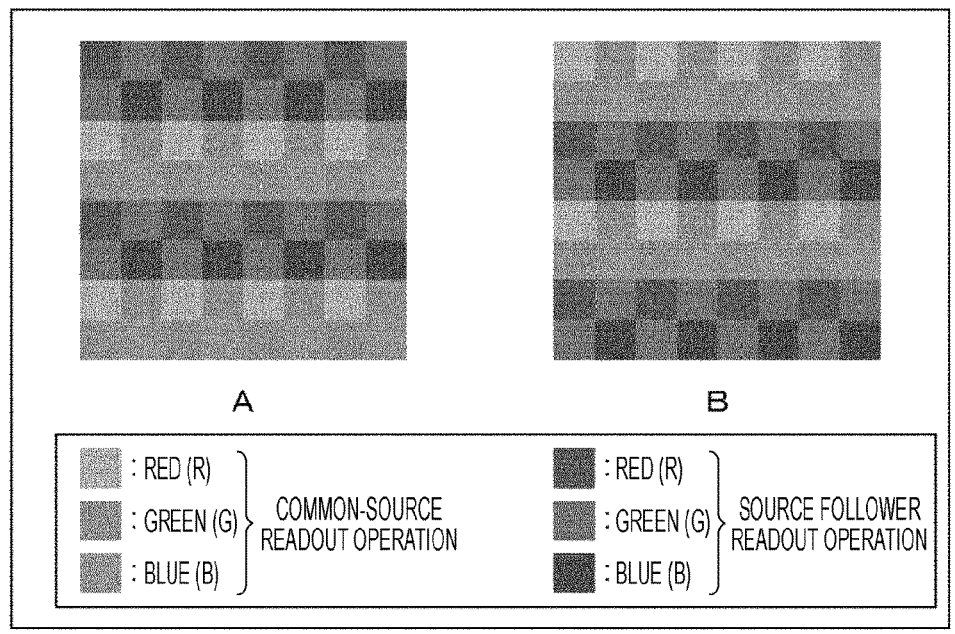
FIG. 13 is a diagram schematically illustrating an array of pixel colors in a case where operating modes are switched alternately and successively in a horizontal direction.

FIG. 13 is a diagram schematically illustrating an array of pixel colors in a case where the common-source readout operation and the source follower readout operation are switched alternately and successively in the horizontal direction.

As illustrated in FIG. 13, the plurality of pixels 31 in the pixel array unit 21 is arranged in two dimensions to form a Bayer array. The Bayer array arranges green (G) color filters in a checkerboard pattern and arranges red (R) and blue (B) color filters alternately by the column in the remaining part.

In FIG. 13, the frame illustrated in A of FIG. 13 is a frame acquired one frame before the frame illustrated in B of FIG. 13 timewise. For the convenience of description, the frame in A of FIG. 13 is referred to as a "preceding frame", and the frame in B of FIG. 13 is referred to as a "following frame" in the following description. Note that a similar relationship applies to FIGS. 14 and 15 to be described.

In the preceding frame illustrated in A of FIG. 13, pixels in first and second rows from the top as well as pixels in fifth and sixth rows from the top are read by the source follower readout operation, whereas pixels in third and fourth rows from the top as well as pixels in seventh and eighth rows from the top are read by the common-source readout operation. Moreover, in the following frame illustrated in B of FIG. 13, pixels in first and second rows from the top as well as pixels in fifth and sixth rows from the top are read by the common-source readout operation, whereas pixels in third and fourth rows from the top as well as pixels in seventh and eighth rows from the top are read by the source follower readout operation.

That is, in FIG. 13, the common-source readout operation and the source follower readout operation are switched between adjacent rows of the same colors by performing the common-source readout operation in a preceding row of the same colors and performing the source follower readout operation in a following row of the same colors, whereby a signal with high conversion efficiency (high illumination signal) and a signal with low conversion efficiency (low illumination signal) are alternately output in a fixed manner. Moreover, the rows read by the common-source readout operation and the rows read by the source follower readout operation are reversed between the preceding frame in A of FIG. 13 and the following frame in B of FIG. 13.

(Drive Method for Alternately and Successively Switching Operating Modes Frame by Frame)

Figure 14:
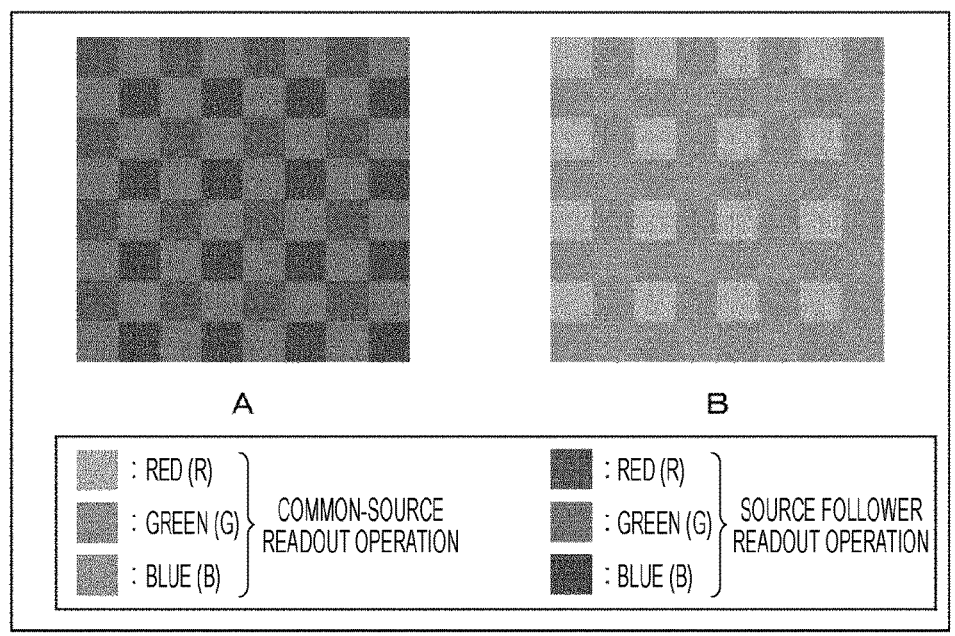
FIG. 14 is a diagram schematically illustrating an array of pixel colors in a case where the operating modes are switched alternately and successively frame by frame.

FIG. 14 is a diagram schematically illustrating an array of pixel colors in a case where the common-source readout operation and the source follower readout operation are switched alternately and successively frame by frame.

Pixels in all rows of the preceding frame illustrated in A of FIG. 14 are read by the source follower readout operation. Moreover, pixels in all rows of the following frame illustrated in B of FIG. 14 are read by the common-source readout operation.

That is, in FIG. 14, the common-source readout operation and the source follower readout operation are switched frame by frame by performing the source follower readout operation in the preceding frame and performing the common-source readout operation in the following frame, whereby a signal with high conversion efficiency (high illumination signal) and a signal with low conversion efficiency (low illumination signal) are alternately output in a fixed manner.

(Drive Method for Alternately and Successively Switching Operating Modes in Horizontal and Vertical Directions)

Figure 15:
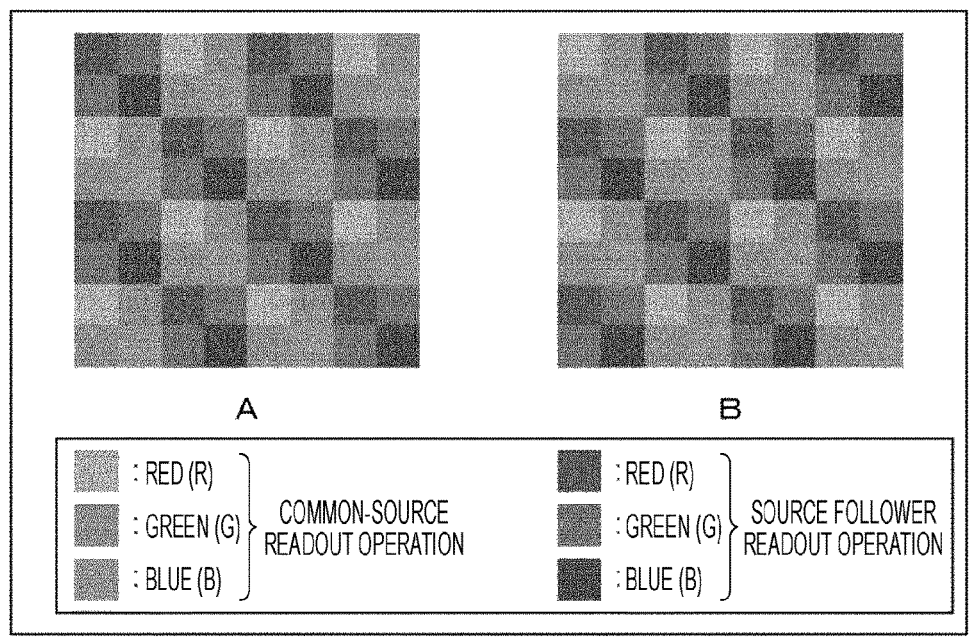
FIG. 15 is a diagram each schematically illustrating an array of pixel colors in a case where the operating modes are switched alternately and successively in the horizontal direction and a vertical direction.

FIG. 15 is a diagram schematically illustrating an array of pixel colors in a case where the common-source readout operation and the source follower readout operation are switched alternately and successively in the horizontal and vertical directions.

In the preceding frame illustrated in A of FIG. 15, pixels in first and second rows from the top as well as pixels in fifth and sixth rows from the top are read by the source follower readout operation and the common-source readout operation repeatedly every 2×2 pixels, whereas pixels in third and fourth rows from the top as well as pixels in seventh and eighth rows from the top are read by the common-source readout operation and the source follower readout operation repeatedly every 2×2 pixels. Moreover, in the following frame illustrated in B of FIG. 15, pixels in first and second rows from the top as well as pixels in fifth and sixth rows from the top are read by the common-source readout operation and the source follower readout operation repeatedly every 2×2 pixels, whereas pixels in third and fourth rows from the top as well as pixels in seventh and eighth rows from the top are read by the source follower readout operation and the common-source readout operation repeatedly every 2×2 pixels.

That is, in FIG. 15, pixels of the same color in a certain row are each read by the common-source readout operation or the source follower readout operation alternately every other pixel in the horizontal direction, and those pixels of the same color in a subsequent row are each read by a reversed operating mode, namely by the source follower readout operation or the common-source readout operation alternately every other pixel. Moreover, the pixels read by the common-source readout operation and the pixels read by the source follower readout operation are reversed between the preceding frame in A of FIG. 15 and the following frame in B of FIG. 15. This allows the operating mode to be switched successively in a fixed manner to successively output a signal with high conversion efficiency (high illumination signal) and a signal with low conversion efficiency (low illumination signal) in a fixed manner.

Note that the drive methods described with reference to FIGS. 13 to 15 are illustrated as an example, where another drive method for switching the operating modes between the common-source readout operation and the source follower readout operation may be adopted to alternately and successively switch the operating modes in a fixed manner and alternately output two kinds of signals being the signal with high conversion efficiency (high illumination signal) and the signal with low conversion efficiency (low illumination signal) in a fixed manner.

3. Second Embodiment (Configuration of Pixel-Column Signal Processing Circuit)

Figure 16:
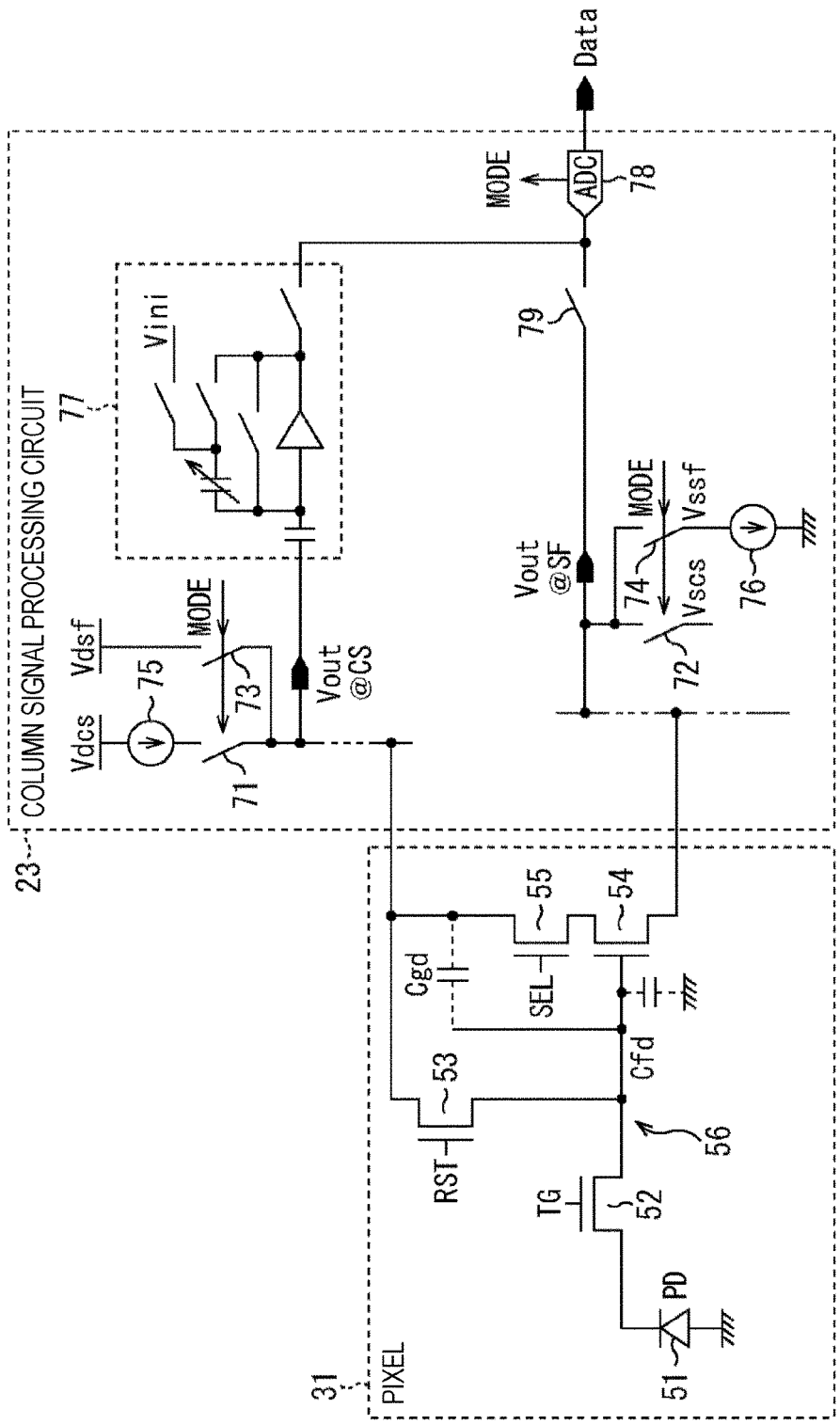
FIG. 16 is a diagram illustrating an example of the configuration of a pixel-column signal processing circuit according to a second embodiment.

FIG. 16 is a diagram illustrating the configuration of a pixel-column signal processing circuit according to a second embodiment.

The pixel-column signal processing circuit of FIG. 16 is different from the configuration of FIG. 2 in that the operating mode is switched between a common-source readout operation and a source follower readout operation adaptively according to a mode control signal (MODE) from an A/D converter circuit 78. A configuration that is the same in FIGS. 16 and 2 is denoted by the same reference numeral to omit a description of such configuration as appropriate.

After a transfer transistor 52 transfers an electric charge accumulated in a photodiode 51 to a floating diffusion region 56, for example, the A/D converter circuit 78 of FIG. 16 attempts rough A/D conversion for determining the operating mode to thus be able to determine the operating mode suitable for output (signal) of the conversion. The A/D converter circuit 78 supplies a mode control signal (MODE) corresponding to the operating mode being determined to switches 71 to 74. This causes the switches 71 to 74 to be in an on or off state to perform the common-source readout operation or the source follower readout operation.

(First Readout Method of Second Embodiment)

Here, a first pixel readout method employed by the pixel-column signal processing circuit of FIG. 16 will be described with reference to FIGS. 17 and 18.

(In a Case Where Subject is in Low Illumination)

Figure 17:
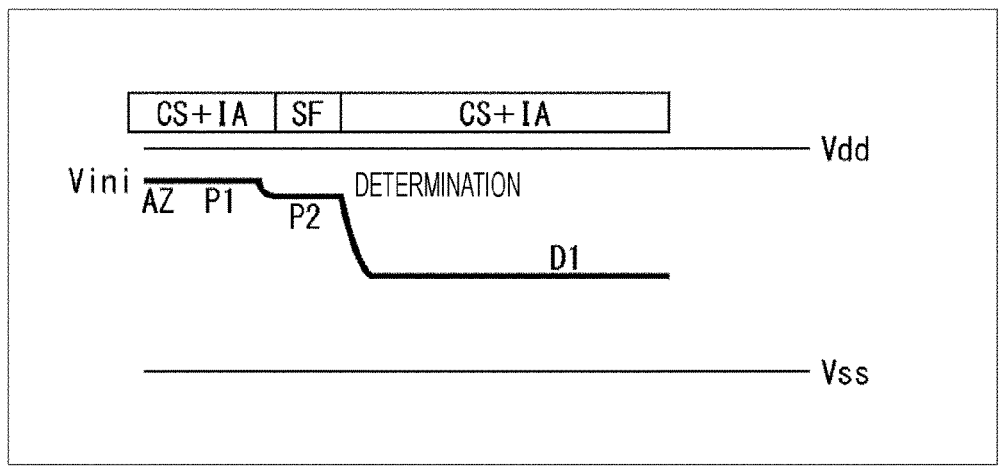
FIG. 17 is a timing waveform diagram of a signal read by a first pixel readout method according to the second embodiment.

FIG. 17 illustrates the waveform of a signal input to the A/D converter circuit 78 and the operating mode set by the A/D converter circuit 78 in a case where a subject is in low illumination. Note that in FIG. 17, "CS+IA" is an abbreviation for "Common Source" and "Inverting Amplifier" and indicates that the operating mode is set to the common-source readout operation, while "SF" is an abbreviation for "Source Follower" and indicates that the operating mode is set to the source follower readout operation. A similar relationship applies to other figures to be described.

As illustrated in FIG. 17, the operating mode is first set to the common-source readout operation (CS+IA) to complete an AZ period and then turn on a reset transistor 53, by which the floating diffusion region 56 is reset to acquire a reset level (P1) for the common source. The operating mode is thereafter switched to the source follower readout operation (SF) to acquire a reset level (P2) for the source follower in a similar manner.

Then in a case where the transfer transistor 52 is turned on in the common-source readout operation (CS+IA), the electric charge accumulated in the photodiode 51 is transferred to the floating diffusion region 56 to output a signal level, where it is determined whether the output (signal) is saturated (indicated by "determination (period)" in the figure). In a case where it is determined by the determination that the signal level is not saturated in the common-source readout operation, the reset level (P2) for the source follower having been acquired is discarded to acquire a signal level (D1) for the common source. In this case, the common-source readout operation is maintained as the operating mode.

As a result, a CDS operation is performed on the basis of a difference between the reset level (P1) for the common source and the signal level (D1) for the common source to obtain a net signal being read from a pixel 31.

(In a Case Where Subject is in High Illumination)

Figure 18:
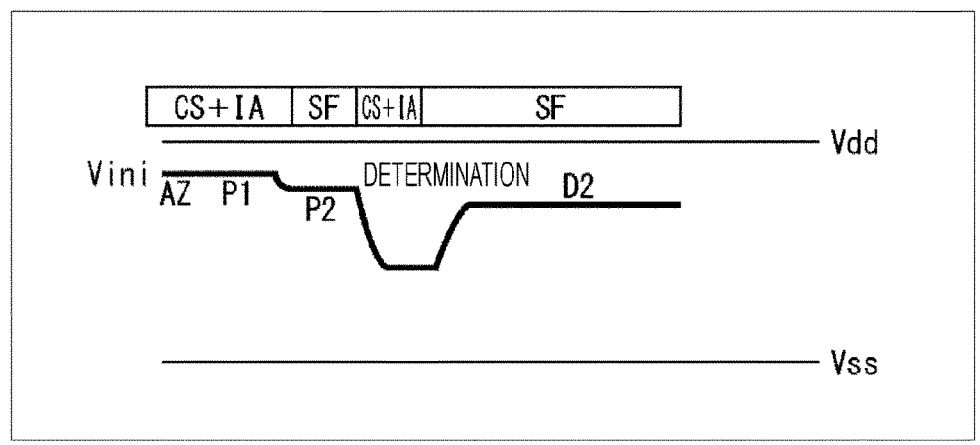
FIG. 18 is a timing waveform diagram of a signal read by the first pixel readout method according to the second embodiment.

FIG. 18 illustrates the waveform of a signal input to the A/D converter circuit 78 and the operating mode set by the A/D converter circuit 78 in a case where a subject is in high illumination.

As illustrated in FIG. 18, the operating mode is first set to the common-source readout operation (CS+IA) to complete an AZ period, reset the floating diffusion region 56, and acquire a reset level (P1) for the common source. The operating mode is thereafter switched to the source follower readout operation (SF) to acquire a reset level (P2) for the source follower in a similar manner.

Then in the common-source readout operation (CS+IA), the electric charge accumulated in the photodiode 51 is transferred to the floating diffusion region 56 to output a signal level, where it is determined whether the output (signal) is saturated (indicated by "determination (period)" in the figure). The operating mode is switched from the common-source readout operation (CS+IA) to the source follower readout operation (SF) in a case where it is determined by the determination that the signal level is saturated in the common-source readout operation. The reset level (P1) for the common source having been acquired is discarded as well.

Moreover, a signal level (D2) for the source follower is acquired in the source follower readout operation (SF) since the electric charge accumulated in the photodiode 51 is transferred to the floating diffusion region 56 in the common-source readout operation (CS+IA). As a result, a CDS operation is performed on the basis of a difference between the reset level (P2) for the source follower and the signal level (D2) for the source follower to obtain a net signal being read from the pixel 31.

According to the first readout method of the second embodiment that controls the operating mode by the mode control signal (MODE) supplied from the A/D converter circuit 78 as described above, the operation from the AZ period to the determination period is fixed, and the operating mode is determined adaptively according to the result of determination on the signal level to thus perform the common-source readout operation or the source follower readout operation according to the operating mode being determined.

Moreover, the reset level (P1) for the common source and the reset level (P2) for the source follower are both acquired after completion of the AZ period to then acquire the signal level (D1) for the common source or the signal level (D2) for the source follower in accordance with the result of determination on the signal level. As a result, the acquisition of each of the AZ and the signal level need only be performed once instead of simply repeating twice the acquisition of the reference at AZ (acquisition of AZ) as well as the acquisition of the reset level and the signal level, whereby the readout time can be sped up or used more efficiently.

Specifically, in a case where the acquisition is simply repeated twice, the AZ, the reset level (P1) for the common source, and the signal level (D1) for the common source are acquired the first time, then the AZ, the reset level (P2) for the source follower, and the signal level (D2) for the source follower are acquired the second time. On the other hand, the first readout method of the second embodiment performs acquisition of the AZ, acquisition of the reset level (P1) for the common source, acquisition of the reset level (P2) for the source follower, transferring of the electric charge, determination on the signal level, and acquisition of the signal level (D) for the operating mode in accordance with the result of determination on the signal level, thereby requiring one less acquisition of each of the AZ and the signal level.

(Second Readout Method of Second Embodiment)

A second pixel readout method employed by the pixel-column signal processing circuit of FIG. 16 will now be described with reference to FIGS. 19 and 20.

(In a Case Where Subject is in Low Illumination)

Figure 19:
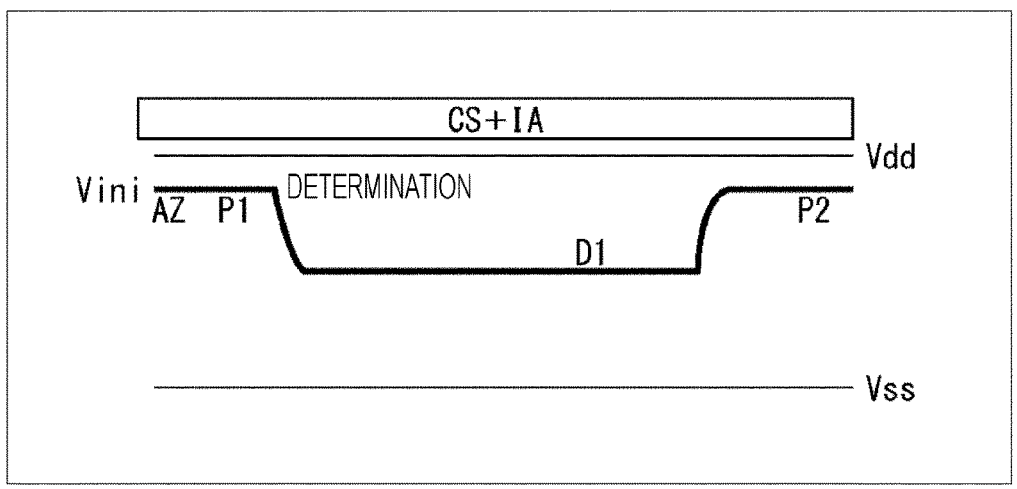
FIG. 19 is a timing waveform diagram of a signal read by a second pixel readout method according to the second embodiment.

FIG. 19 illustrates the waveform of a signal input to the A/D converter circuit 78 and the operating mode set by the A/D converter circuit 78 in a case where a subject is in low illumination.

As illustrated in FIG. 19, the operating mode is first set to the common-source readout operation (CS+IA) to complete the AZ period and then turn on the reset transistor 53, by which the floating diffusion region 56 is reset to acquire the reset level (P1) for the common source. Then in a case where the transfer transistor 52 is turned on during the common-source readout operation (CS+IA) without switching the operating mode, the electric charge accumulated in the photodiode 51 is transferred to the floating diffusion region 56 to output a signal level, where it is determined whether the signal is saturated (indicated by "determination (period)" in the figure).

The signal level (D1) for the common source is acquired in a case where it is determined by the determination that the signal level is not saturated in the common-source readout operation. Although the reset level (P2) for the source follower is thereafter output upon resetting of the floating diffusion region 56, the A/D converter circuit 78 does not acquire the reset level (P2) for the source follower but holds the reset level (P1) and signal level (D1) for the common source having been acquired, or performs a CDS operation on the basis of a difference between the reset level (P1) and signal level (D1) for the common source having been acquired and holds the outcome of the operation (net signal) to output the signal to the outside.

(In a Case Where Subject is in High Illumination)

Figure 20:
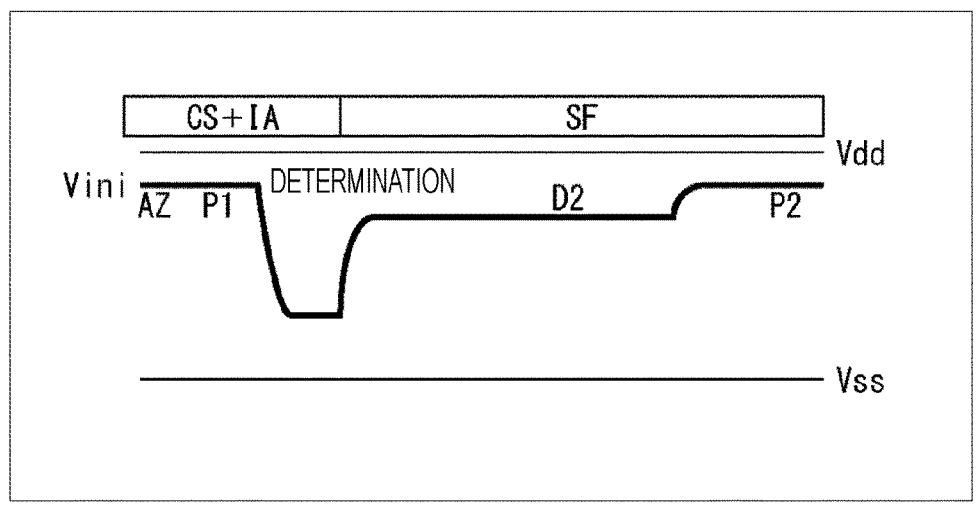
FIG. 20 is a timing waveform diagram of a signal read by the second pixel readout method according to the second embodiment.

FIG. 20 illustrates the waveform of a signal input to the A/D converter circuit 78 and the operating mode set by the A/D converter circuit 78 in a case where a subject is in high illumination.

As illustrated in FIG. 20, the operating mode is first set to the common-source readout operation (CS+IA) to complete the AZ period, reset the floating diffusion region 56, and acquire the reset level (P1) for the common source. Then in the common-source readout operation (CS+IA), the electric charge accumulated in the photodiode 51 is transferred to the floating diffusion region 56 to output a signal level, where it is determined whether the signal is saturated (indicated by "determination (period)" in the figure).

The operating mode is switched from the common-source readout operation (CS+IA) to the source follower readout operation (SF) in a case where it is determined by the determination that the signal level is saturated in the common-source readout operation. The reset level (P1) for the common source having been acquired is discarded as well. Then the signal level (D2) for the source follower is acquired in the source follower readout operation (SF) since the electric charge accumulated in the photodiode 51 is transferred to the floating diffusion region 56 in the common-source readout operation (CS+IA).

Further, following the acquisition of the signal level (D2), the floating diffusion region 56 is reset to acquire the reset level (P2) for the source follower. The A/D converter circuit 78 holds the reset level (P2) and signal level (D2) for the source follower, or performs a CDS operation on the basis of a difference between the reset level (P2) and signal level (D2) for the source follower and holds the outcome of the operation (net signal) to then output the signal to the outside.

As described above, according to the second readout method of the second embodiment that controls the operating mode by the mode control signal (MODE) supplied from the A/D converter circuit 78, the operation from the AZ period to the determination period is fixed, and the operating mode is determined adaptively according to the result of determination on the signal level to thus perform the common-source readout operation or the source follower readout operation according to the operating mode being determined.

Moreover, the reset level (P1) for the common source is acquired after completion of the AZ period to then acquire the signal level (D1) for the common source or the signal level (D2) for the source follower in accordance with the result of determination on the signal level. As a result, the acquisition of each of the AZ and the signal level need only be performed once instead of simply repeating twice the acquisition of the AZ as well as the acquisition of the reset level and the signal level, whereby the readout time can be sped up or used more efficiently.

Specifically, in a case where the acquisition is simply repeated twice, the AZ, the reset level (P1) for the common source, and the signal level (D1) for the common source are acquired the first time, then the AZ, the reset level (P2) for the source follower, and the signal level (D2) for the source follower are acquired the second time. On the other hand, the second readout method of the second embodiment performs acquisition of the AZ, acquisition of the reset level (P1) for the common source, transferring of the electric charge, determination on the signal level, acquisition of the signal level (D) for the operating mode in accordance with the result of determination on the signal level, and acquisition of the reset level (P2) for the source follower, thereby requiring one less acquisition of each of the AZ and the signal level.

Note that in a case where a subject is in high illumination, the second readout method of the second embodiment acquires the reset level (P2) for the source follower by resetting the floating diffusion region 56 after acquisition of the signal level (D2) for the source follower to thus end up with an incomplete CDS signal uncorrelated with reset noise, the CDS signal being also referred to as a double data sampling (DDS) signal or a delta reset sampling (DRS) signal. Such reset noise is conspicuous in a general CMOS image sensor, while in the second readout method of the second embodiment, the CDS signal is a signal on the high illumination (high luminance) side read by the source follower readout operation, and is thus not used in low illumination and buried in shot noise of the signal to be less easily recognized and be inconspicuous.

4. Third Embodiment

Now, the aforementioned pixel-column signal processing circuit switches the operating mode according to two levels of illumination being low illumination and high illumination, but at a level of illumination even higher than high illumination (such illumination will be hereinafter referred to as "ultra-high illumination"), a signal level for the source follower is saturated to cause the dynamic range to remain narrow. Third and fourth embodiments will thus describe a pixel-column signal processing circuit adapted for ultra-high illumination with the dynamic range unchanged.

(Configuration of Pixel-Column Signal Processing Circuit)

Figure 21:
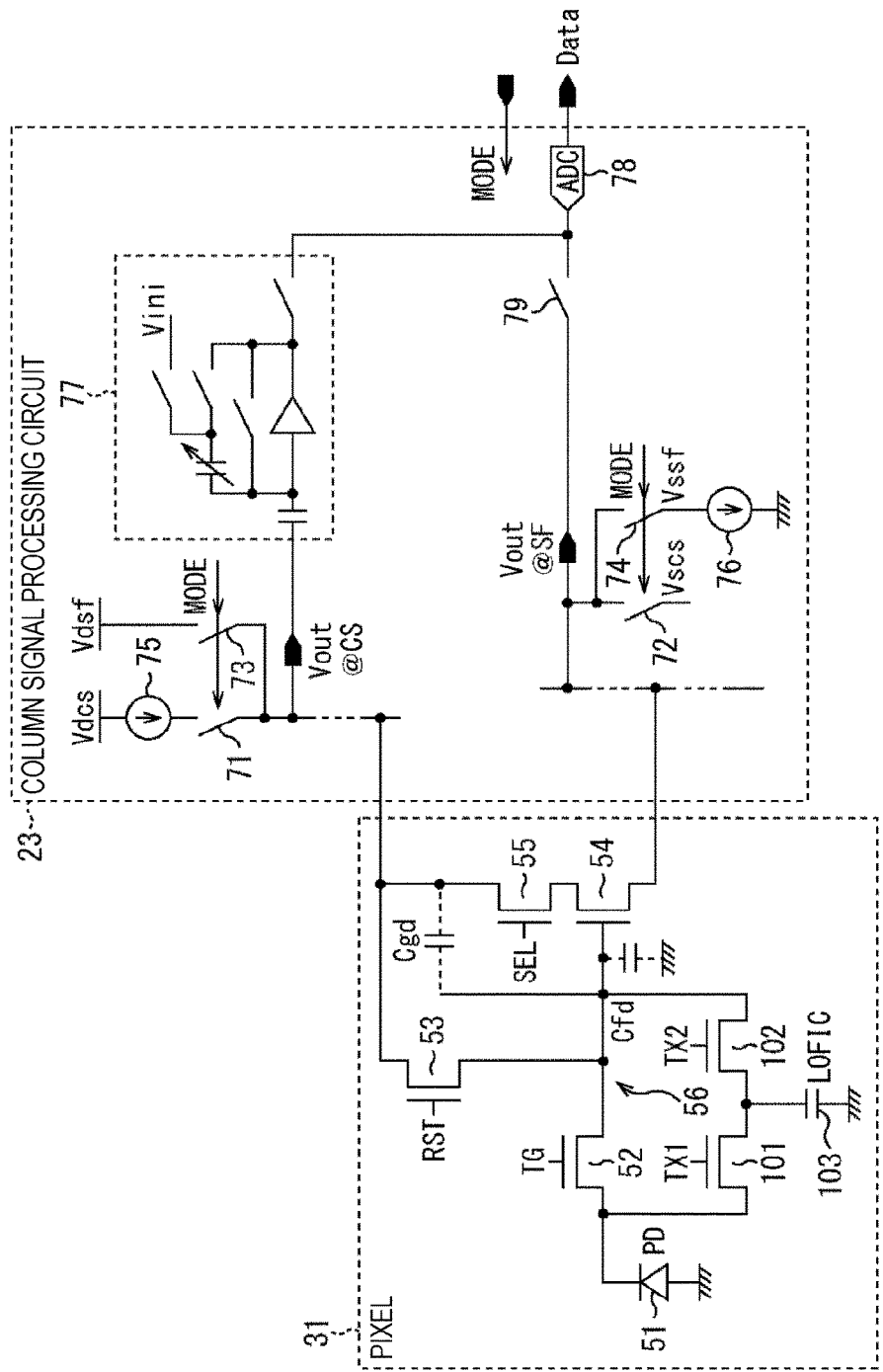
FIG. 21 is a diagram illustrating an example of the configuration of a pixel-column signal processing circuit according to a third embodiment.

FIG. 21 is a diagram illustrating the configuration of the pixel-column signal processing circuit according to the third embodiment.

The pixel-column signal processing circuit of FIG. 21 is different from the configuration of FIG. 2 in that a lateral overflow integration capacitor (hereinafter referred to as an "LOFIC") structure is provided in a pixel 31. A configuration that is the same in FIGS. 21 and 2 is denoted by the same reference numeral to omit a description of such configuration as appropriate.

As illustrated in FIG. 21, the pixel 31 includes a LOFIC capacitor 103 as the lateral overflow integration capacitor that is connected between a LOFIC transistor 101 and a LOFIC transistor 102. Moreover, the LOFIC transistor 101 is connected between a photodiode 51 and a transfer transistor, and the LOFIC transistor 102 is connected between a floating diffusion region 56 and an amplifying transistor 56.

With such LOFIC structure being adopted, the LOFIC transistor 101 receiving a drive pulse TX1 at a gate thereof is turned on or has an overflow potential to allow an electric charge generated in the photodiode 51 to be accumulated in the LOFIC capacitor 103 through the LOFIC transistor 101. This can increase the electric charge or the amount thereof that can be handled.

Moreover, the LOFIC transistor 102 receiving a drive pulse TX2 at a gate thereof continues to be in an on state in a source follower readout operation to be able to have lower conversion efficiency than a general source follower readout operation. As a result, the pixel-column signal processing circuit can accommodate ultra-high illumination with the dynamic range unchanged. A readout operation using such LOFIC structure will be hereinafter referred to as an "LOFIC readout operation".

(Readout Method of Third Embodiment)

A pixel readout method employed by the pixel-column signal processing circuit of FIG. 21 will now be described.

The readout method of the third embodiment can read a pixel by fixing the operating mode for each frame or, as with the readout method of the first embodiment, by switching the operating mode between the common-source readout operation and the source follower readout operation according to a mode control signal (MODE) from the outside.

Moreover, as with the readout method of the first embodiment, the operating mode can be switched alternately and successively in the horizontal direction (FIG. 13), switched alternately and successively frame by frame (FIG. 14), or switched alternately and successively in the horizontal and vertical directions (FIG. 15). Note that the first embodiment uses two kinds of operating modes being a common-source readout mode and a source follower readout mode to thus have two kinds of pixel readout patterns, whereas the third embodiment additionally uses the LOFIC readout operation to have three kinds of operating modes and accordingly three kinds of pixel readout patterns.

(Common-Source Readout Operation)

The output (signal) of the common-source readout operation has the waveform basically similar to that of FIG. 9 and thus will not be described.

(Source Follower Readout Operation and LOFIC Readout Operation)

Figure 22:
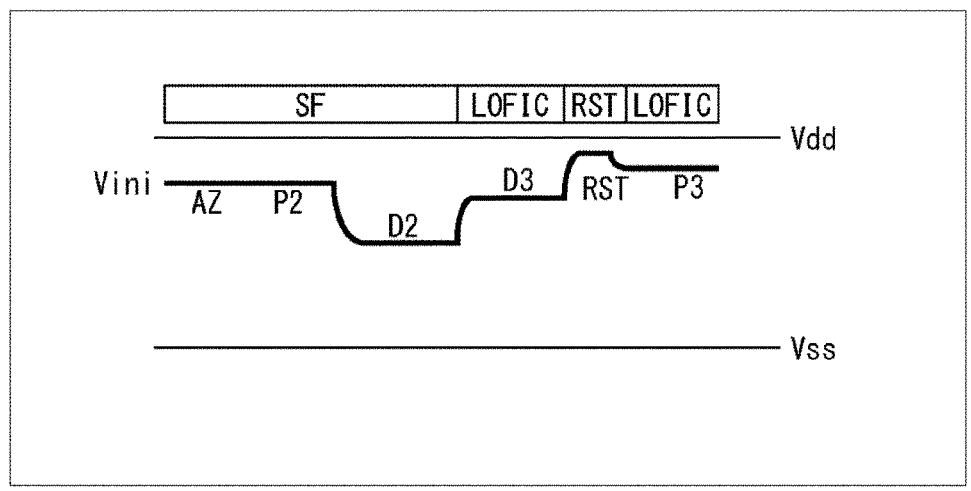
FIG. 22 is a timing waveform diagram of a signal read by a pixel readout method according to the third embodiment.

FIG. 22 illustrates the waveform of a signal input to an A/D converter circuit 78 and the operating mode in a case where the source follower readout operation and the LOFIC readout operation are performed. Note that FIG. 22 illustrates "SF" indicating that the operating mode is set to the source follower readout, as well as "LOFIC" and "RST". The "LOFIC" indicates that the operating mode is set to the LOFIC readout operation, and "RST" indicates resetting of the floating diffusion region 56. A similar relationship applies to other figures to be described.

As illustrated in FIG. 22, the operating mode is first set to the source follower readout operation (SF) by the mode control signal (MODE) input from the outside to complete an AZ period, reset the floating diffusion region 56, and then acquire a reset level (P2) for the source follower. Moreover, the electric charge accumulated in the photodiode 51 is transferred to the floating diffusion region 56 to acquire a signal level (D2) for the source follower.

The LOFIC transistor 102 is thereafter turned on to decrease the value of capacitance of the floating diffusion region 56 and at the same time distributes the electric charge accumulated in the LOFIC capacitor 103 between the floating diffusion region 56 and the LOFIC capacitor 103. The electric charge in the floating diffusion region 56 is then read as a signal level (D3) to acquire the signal level (D3) for the LOFIC. Following the readout of the signal level (D3), the floating diffusion region 56 is reset to acquire a reset level (P3) for the LOFIC.

As a result, a CDS operation is performed on the basis of a difference between the reset level (P3) for the LOFIC and the signal level (D3) for the LOFIC to obtain a net signal being read from the pixel 31. Note that such control to switch the operating mode between the source follower readout operation and the LOFIC readout operation takes more time than in a case where the common-source readout operation is performed, and is thus not suitable for the drive that alternately and successively switches the operating mode in the horizontal and vertical directions (as it corresponds to FIG. 15), but suitable for the drive that alternately and successively switches the operating mode in the horizontal direction (as it corresponds to FIG. 13) or the drive that alternately and successively switches the operating mode frame by frame (as it corresponds to FIG. 14).

As described above, the readout method of the third embodiment performs the drive that alternately and successively switches the operating mode in the horizontal direction (as it corresponds to FIG. 13) or the drive that alternately and successively switches the operating mode frame by frame (as it corresponds to FIG. 14), for example, whereby the total of three kinds of signals are output from each pixel, the signals including a signal with one kind of high conversion efficiency (high illumination signal) obtained by the common-source readout operation, and signals with two kinds of low conversion efficiencies (low illumination signals) obtained by the source follower readout operation and the LOFIC readout operation. As a result, the signals corresponding to the three kinds of conversion efficiencies are output to be able to accommodate output (signal) of ultra-high illumination unlike the case of having the two kinds of conversion efficiencies as described above.

5. Fourth Embodiment (Configuration of Pixel-Column Signal Processing Circuit)

Figure 23:
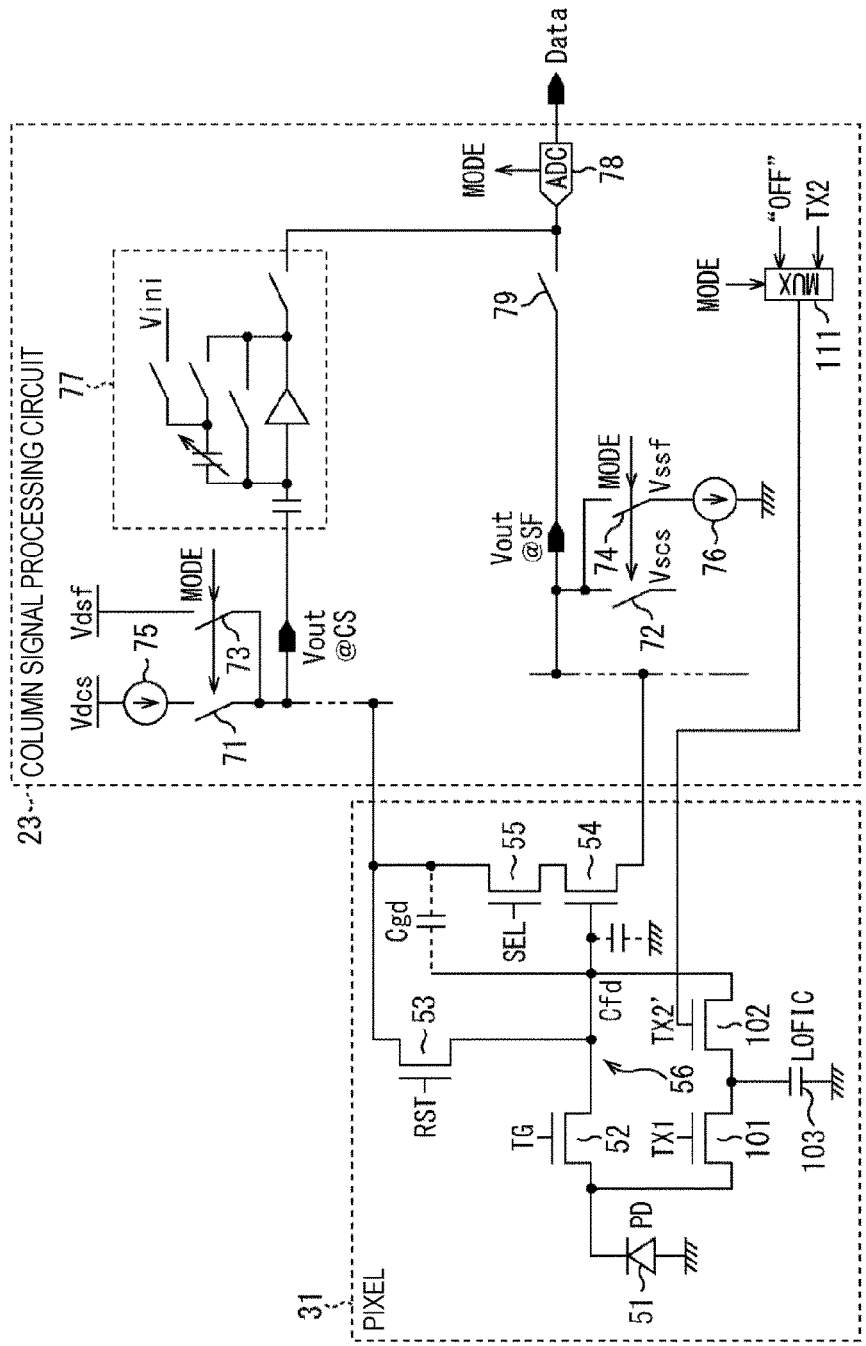
FIG. 23 is a diagram illustrating an example of the configuration of a pixel-column signal processing circuit according to a fourth embodiment.

FIG. 23 is a diagram illustrating the configuration of a pixel-column signal processing circuit according to a fourth embodiment.

The pixel-column signal processing circuit of FIG. 23 is different from the configuration of FIG. 21 in that the operating mode is switched adaptively according to a mode control signal (MODE) from an A/D converter circuit 78. A configuration that is the same in FIGS. 21 and 23 is denoted by the same reference numeral to omit a description of such configuration as appropriate.

As with the second embodiment, the A/D converter circuit 78 of FIG. 23 performs processing to determine the operating mode, and supplies a mode control signal (MODE) corresponding to the operating mode being determined to switches 71 to 74. This causes the switches 71 to 74 to be in an on or off state to perform a common-source readout operation or a source follower readout operation.

The pixel-column signal processing circuit of FIG. 23 is further provided with an MUX 111. The MUX 111 inputs a drive pulse TX2 to a gate of an LOFIC transistor 102 in response to the mode control signal (MODE) from the A/D converter circuit 78. The LOFIC transistor 102 is connected to a floating diffusion region 56 in a case where the drive pulse TX2 from the MUX 111 is input to the gate of the transistor. That is, the operating mode is set to an LOFIC readout operation in this case. Note that the MUX 111 is configured to be initialized when the gate of the LOFIC transistor 102 is forcibly enabled at the time of reset. Moreover, "OFF" is input to the gate of the LOFIC transistor 102 in a case where the transistor is not used. Here, "OFF" may be a GND level or a negative potential to perform leakage control.

(First Readout Method of Fourth Embodiment)

Figure 24:
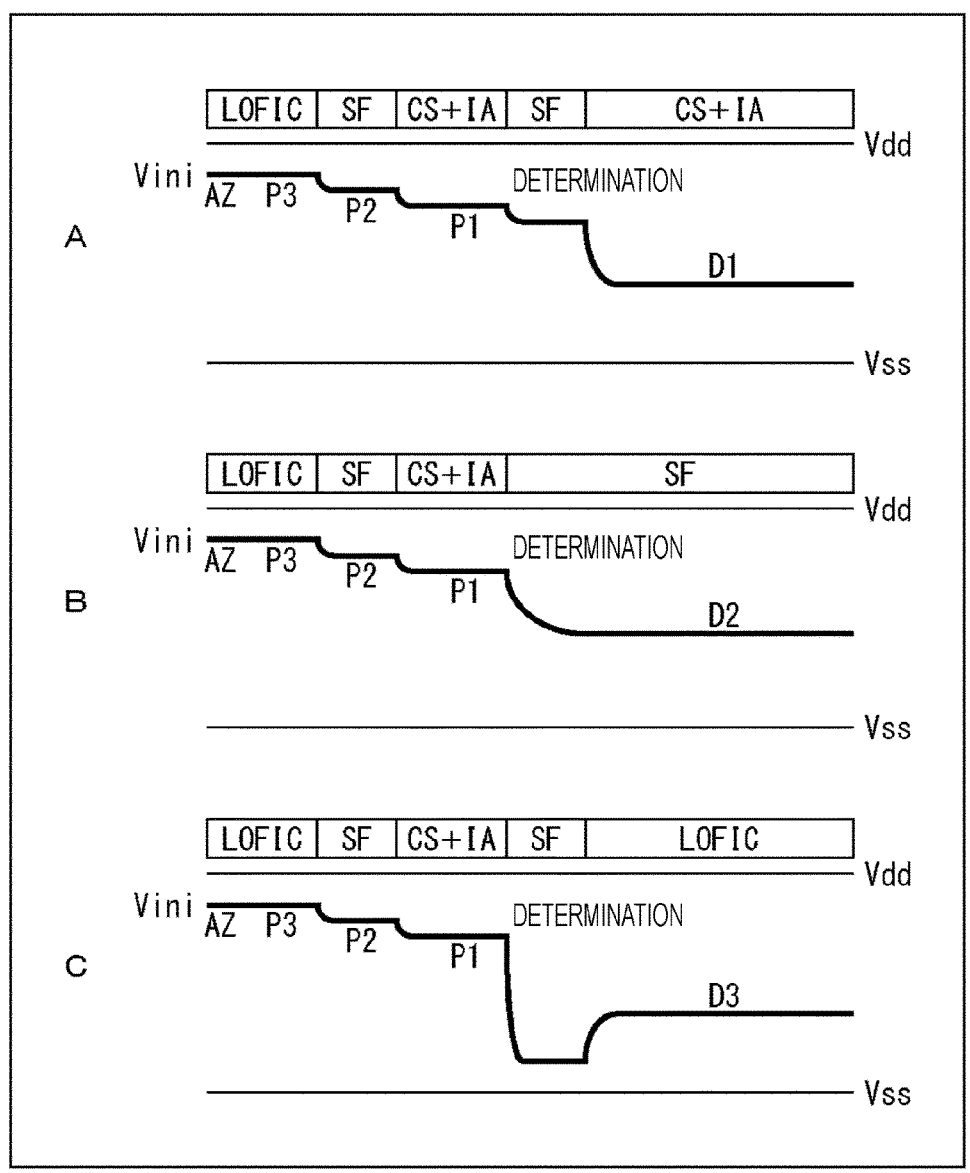
FIG. 24 is a timing waveform diagram of a signal read by a first pixel readout method according to the fourth embodiment.

FIG. 24 illustrates the waveform of a signal input to the A/D converter circuit 78 and the operating mode set by the A/D converter circuit 78 in a case where three kinds of conversion efficiencies are switched by determination.

In FIG. 24, A of FIG. 24 illustrates the waveform of a signal and the operating mode in low illumination to which the common-source readout operation is applied, B of FIG. 24 illustrates the waveform of a signal and the operating mode in high illumination to which the source follower readout operation is applied, and C of FIG. 24 illustrates the waveform of a signal and the operating mode in ultra-high illumination to which the LOFIC readout operation is applied. Note that "low illumination", "high illumination", and "ultra-high illumination" are defined according to the illumination of a subject for descriptive purposes, where the illumination may also be defined by three levels such as "low illumination", "intermediate illumination", and "high illumination".

(In a Case Where Subject is in Low Illumination)

As illustrated in A of FIG. 24, the operating mode is first set to the LOFIC readout operation (LOFIC) to complete an AZ period, reset the floating diffusion region 56, and acquire a reset level (P3) for the LOFIC. The operating mode is thereafter switched to the source follower readout operation (SF) to acquire a reset level (P2) for the source follower in a similar manner. The operating mode is further switched to the common-source readout operation (CS+IA) to acquire a reset level (P1) for the common source in a similar manner.

The signal level is then subjected to determination (indicated by "determination (period) in the figure). Here, although the determination may be performed after switching the configuration of the readout circuit to one corresponding to each operating mode, the switching of the circuit may take time so that the operating mode is switched to the source follower readout operation (SF) to compare output (voltage) of the signal level with a predetermined threshold voltage and then perform determination on the signal level, for example.

Specifically, the predetermined threshold voltage is switched to determine twice whether the output (voltage) of the signal level acquired by transferring the electric charge accumulated in the photodiode 51 to the floating diffusion region 56 is lower or higher than the threshold voltage. That is, in a first round of determination, the output (voltage) of the signal level is compared with a first threshold voltage being set to a reference value such that the common-source readout operation is performed in a case where the output (voltage) of the signal level is lower than the first threshold voltage. Further, in a second round of determination, the output (voltage) of the signal level is compared with a second threshold voltage being set to a reference value such that the LOFIC readout operation is performed in a case where the output (voltage) of the signal level is higher than the second threshold voltage to cause the output (signal) to be saturated.

The determination is performed twice as described above by switching the operating mode to the source follower readout operation (SF) corresponding to high illumination (intermediate illumination), which is the intermediate illumination among the three levels of illumination, and comparing the output (voltage) of the signal level with the first threshold voltage and the second threshold voltage, whereby the operating mode can be determined adaptively according to a result of the determination on the signal level. In other words, complex control on the side of pixels 31 can be replaced by the simple control which simply switches twice the threshold voltage to be compared with the signal level. Note that this method of switching the threshold voltage twice is illustrated as an example, where another method may be adopted if such method can determine the operating mode adaptively.

In A of FIG. 24, for example, the output (voltage) of the signal level is determined to be lower than the first threshold voltage, which means low illumination so that the operating mode is switched from the source follower readout operation (SF) to the common-source readout operation (CS+IA). A signal level (D1) for the common source is then acquired since the electric charge accumulated in the photodiode 51 is transferred to the floating diffusion region 56. As a result, a CDS operation is performed on the basis of a difference between the reset level (P1) for the common source and the signal level (D1) for the common source to obtain a net signal being output from the pixel 31. Note that the reset level (P2) for the source follower and the reset level (P3) for the LOFIC are discarded in this case.

(In a Case Where Subject is in High Illumination (Intermediate Illumination))

In B of FIG. 24, the operation performed from the AZ period to the determination period is similar to that in A of FIG. 24, and the operating mode is determined adaptively according to a result of determination on the signal level by the source follower readout operation (SF). In B of FIG. 24, for example, the output (voltage) of the signal level is determined to be higher than or equal to the first threshold voltage and lower than the second threshold voltage, which means high illumination (intermediate illumination) so that the source follower readout operation (SF) is maintained as the operating mode. A signal level (D2) for the source follower is then acquired since the electric charge accumulated in the photodiode 51 is transferred to the floating diffusion region 56.

As a result, a CDS operation is performed on the basis of a difference between the reset level (P2) for the source follower and the signal level (D2) for the source follower to obtain a net signal being output from the pixel 31. Note that the reset level (P1) for the common source and the reset level (P3) for the LOFIC having been acquired are discarded in this case.

(In a Case where Subject is in Ultra-High Illumination (High Illumination))

In C of FIG. 24, the operation performed from the AZ period to the determination period is similar to that in A of FIG. 24, and the operating mode is determined adaptively according to a result of determination on the signal level by the source follower readout operation (SF). In C of FIG. 24, for example, the output (voltage) of the signal level is determined to be higher than or equal to the first threshold voltage and the second threshold voltage, which means ultra-high illumination (high illumination) so that the operating mode is switched from the source follower readout operation (SF) to the LOFIC readout operation (LOFIC). A signal level (D3) for the LOFIC is then acquired since the electric charge accumulated in the photodiode 51 is transferred to the floating diffusion region 56.

As a result, a CDS operation is performed on the basis of a difference between the reset level (P3) for the LOFIC and the signal level (D3) for the LOFIC to obtain a net signal being output from the pixel 31. Note that the reset level (P1) for the common source and the reset level (P2) for the source follower having been acquired are discarded in this case.

Note that the operation (driving) performed from the AZ period to the determination period in A to C of FIG. 24 acquires the AZ and then desirably acquires the reset level while switching the operating mode in order from one with the lowest gain being the LOFIC readout operation (LOFIC), followed by the source follower readout operation (SF) and the common-source readout operation (CS+IA). It is desirable to acquire the reset level (P3) for the LOFIC first and then acquire the reset level (P1) for the common source and the reset level (P2) for the source follower because, in a case where the reset level (P1) for the common source and the reset level (P2) for the source follower are acquired before the reset level (P3) for the LOFIC, the potential of the floating diffusion region 56 varies before and after reading the reset level (P3) for the LOFIC due to injection of the electric charge remaining in the LOFIC (LOFIC capacitor 103).

As described above, according to the first readout method of the fourth embodiment that controls the operating mode by the mode control signal (MODE) supplied from the A/D converter circuit 78, the operation performed from the AZ period to the determination period is fixed, and the operating mode is determined adaptively according to the result of determination on the signal level to thus perform the common-source readout operation, the source follower readout operation, or the LOFIC readout operation according to the operating mode being determined. That is, one of the three kinds of conversion efficiencies is applied in accordance with the subject illumination to thus be able to accommodate the output (signal) of ultra-high illumination.

(Second Readout Method of Fourth Embodiment)

Figure 25:
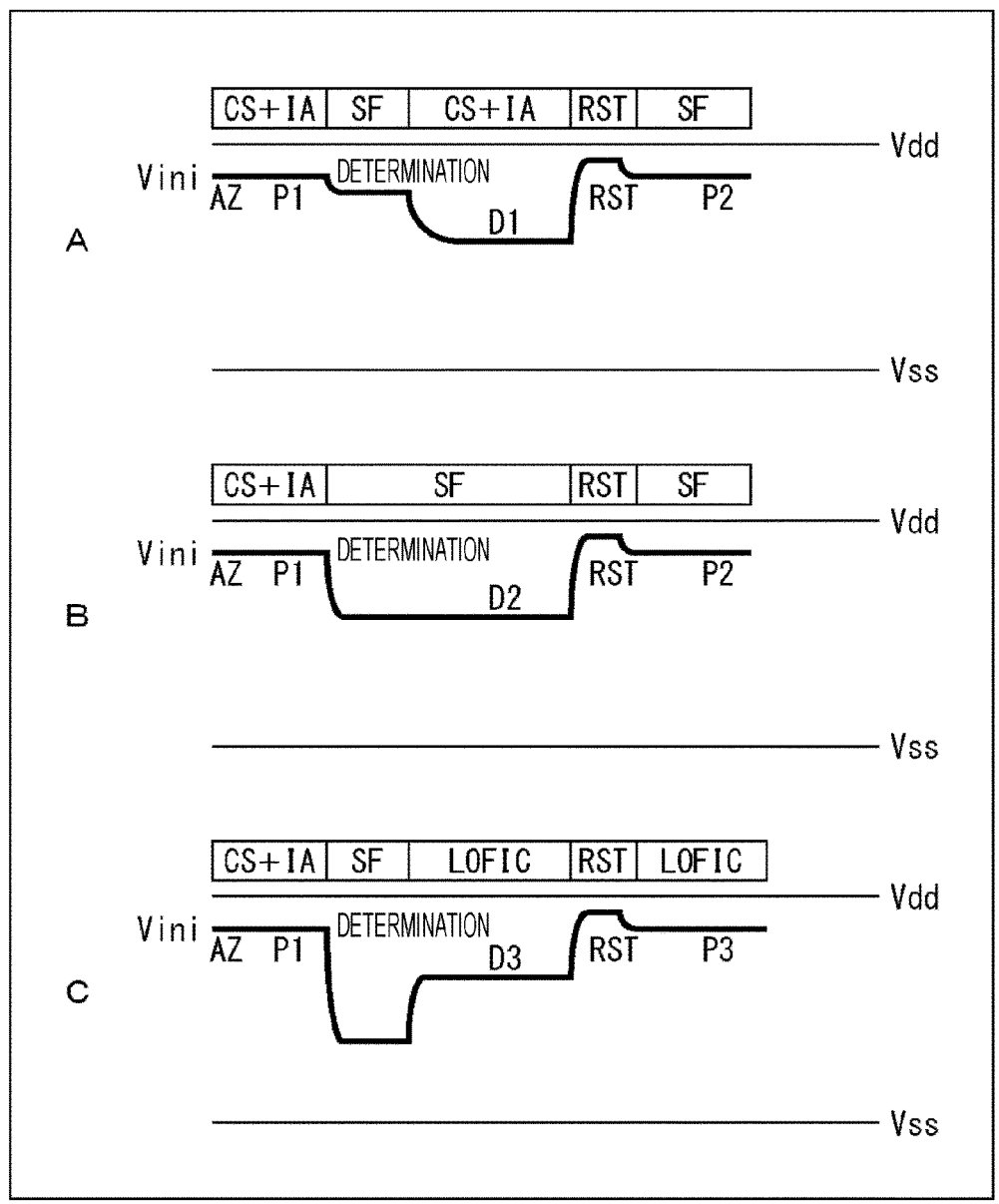
FIG. 25 is a timing waveform diagram of a signal read by a second pixel readout method according to the fourth embodiment.

FIG. 25 illustrates the waveform of a signal input to the A/D converter circuit 78 and the operating mode set by the A/D converter circuit 78 in a case where three kinds of conversion efficiencies are switched by determination.

As with FIG. 24, A of FIG. 25 illustrates the waveform of a signal and the operating mode in low illumination to which the common-source readout operation is applied, B of FIG. 25 illustrates the waveform of a signal and the operating mode in high illumination (intermediate illumination) to which the source follower readout operation is applied, and C of FIG. 25 illustrates the waveform of a signal and the operating mode in ultra-high illumination (high illumination) to which the LOFIC readout operation is applied.

(In a Case where Subject is in Low Illumination)

As illustrated in A of FIG. 25, the operating mode is first set to the common-source readout operation (CS+IA) to complete the AZ period, reset the floating diffusion region 56, and acquire a reset level (P1) for the common source.

The signal level is then subjected to determination (indicated by "determination (period) in the figure). Here, although the determination may be performed after switching the configuration of the readout circuit to one corresponding to each operating mode, the switching of the circuit may take time so that, as with the first readout method in FIG. 24, the operating mode is switched to the source follower readout operation (SF) to compare output (voltage) of the signal level with a predetermined threshold voltage and then perform determination on the signal level, for example.

Specifically, the predetermined threshold voltage is switched to determine twice whether the output (voltage) of the signal level is lower or higher than the threshold voltage. That is, in a first round of determination, the output (voltage) of the signal level is compared with a first threshold voltage being set to a reference value which isolates the common-source readout operation in low illumination and the source follower readout operation in high illumination (intermediate illumination). Further, in a second round of determination, the output (voltage) of the signal level is compared with a second threshold voltage being set to a reference value which isolates the source follower readout operation in high illumination (intermediate illumination) and the LOFIC readout operation in ultra-high illumination (high illumination).

The determination is performed twice as described above by switching the operating mode to the source follower readout operation (SF) corresponding to high illumination (intermediate illumination), which is the intermediate illumination among the three levels of illumination, and comparing the output (voltage) of the signal level with the first threshold voltage and the second threshold voltage, whereby the operating mode can be determined adaptively according to a result of the determination on the signal level. In other words, complex control on the side of the pixels 31 can be replaced by the simple control which simply switches twice the threshold voltage to be compared with the signal level. Note that this method of switching the threshold voltage twice is illustrated as an example, where another method may be adopted if such method can adaptively determine the operating mode.

In A of FIG. 25, for example, the output (voltage) of the signal level is determined to be lower than the first threshold voltage, which means low illumination so that the operating mode is switched from the source follower readout operation (SF) to the common-source readout operation (CS+IA). A signal level (D1) for the common source is then acquired since the electric charge accumulated in the photodiode 51 is transferred to the floating diffusion region 56. Although the reset level (P2) for the source follower is thereafter output upon resetting of the floating diffusion region 56, the A/D converter circuit 78 does not acquire the reset level (P2) for the source follower but holds the reset level (P1) and signal level (D1) for the common source having been acquired, or performs a CDS operation on the basis of a difference between the reset level (P1) and signal level (D1) for the common source having been acquired and holds the outcome of the operation (net signal) to output the signal to the outside.

(In a Case where Subject is in High Illumination (Intermediate Illumination))

In B of FIG. 25, the operation performed from the AZ period to the determination period is similar to that in A of FIG. 25, and the operating mode is determined adaptively according to a result of determination on the signal level by the source follower readout operation (SF). In B of FIG. 25, for example, the output (voltage) of the signal level is determined to be higher than or equal to the first threshold voltage and lower than the second threshold voltage, which means high illumination (intermediate illumination) so that the source follower readout operation (SF) is maintained as the operating mode. A signal level (D2) for the source follower is then acquired since the electric charge accumulated in the photodiode 51 is transferred to the floating diffusion region 56. Note that the reset level (P1) for the common source having been acquired is discarded.

Further, following the acquisition of the signal level (D2), the floating diffusion region 56 is reset to acquire the reset level (P2) for the source follower. The A/D converter circuit 78 holds the reset level (P2) and signal level (D2) for the source follower, or performs a CDS operation on the basis of a difference between the reset level (P2) and signal level (D2) for the source follower and holds the outcome of the operation (net signal) to then output the signal to the outside.

(In a Case where Subject is in Ultra-High Illumination (High Illumination))

In C of FIG. 25, the operation performed from the AZ period to the determination period is similar to that in A of FIG. 25, and the operating mode is determined adaptively according to a result of determination on the signal level by the source follower readout operation (SF). In C of FIG. 25, for example, the output (voltage) of the signal level is determined to be higher than or equal to the first threshold voltage and the second threshold voltage, which means ultra-high illumination (high illumination) so that the operating mode is switched from the source follower readout operation (SF) to the LOFIC readout operation (LOFIC). A signal level (D3) for the LOFIC is then acquired since the electric charge accumulated in the photodiode 51 is transferred to the floating diffusion region 56. Note that the reset level (P1) for the common source having been acquired is discarded.

Further, following the acquisition of the signal level (D3), the floating diffusion region 56 is reset to acquire a reset level (P3) for the LOFIC. The A/D converter circuit 78 holds the reset level (P3) and signal level (D3) for the LOFIC, or performs a CDS operation on the basis of a difference between the reset level (P3) and signal level (D3) for the LOFIC and holds the outcome of the operation (net signal) to then output the signal to the outside.

As described above, according to the second readout method of the fourth embodiment that controls the operating mode by the mode control signal (MODE) supplied from the A/D converter circuit 78, the operation performed from the AZ period to the determination period is fixed, and the operating mode is determined adaptively according to the result of determination on the signal level to thus perform the common-source readout operation, the source follower readout operation, or the LOFIC readout operation according to the operating mode being determined. That is, one of the three kinds of conversion efficiencies is applied in accordance with the subject illumination to thus be able to accommodate the output (signal) of ultra-high illumination (high illumination).

Moreover, the reset level (P1) for the common source is acquired after completion of the AZ period to then acquire the signal level (D1) for the common source, the signal level (D2) for the source follower, or the signal level (D3) for the LOFIC in accordance with the result of determination on the signal level. This causes the floating diffusion region 56 to be reset one more time than the first readout method of FIG. 24, but the reset level is acquired two times less than the first readout method. Accordingly, the second readout method of FIG. 25 may be employed to be able to speed up the readout operation in a case where the A/D converter circuit 78 is an A/D converter circuit with a characteristic that a P phase period is longer than a reset period, for example.

Note that in a case where a subject is in high illumination (intermediate illumination) or ultra-high illumination (high illumination), the second readout method of the fourth embodiment acquires the reset level (P2 or P3) for the source follower or LOFIC by resetting the floating diffusion region 56 after acquisition of the signal level (D2 or D3) for the source follower or LOFIC to thus end up with an incomplete CDS signal (also referred to as a DDS signal or a DRS signal) uncorrelated with reset noise. Such reset noise is conspicuous in a general CMOS image sensor, while in the second readout method of the fourth embodiment, the CDS signal is less easily recognized and inconspicuous because the signal is read by the source follower readout operation or the LOFIC readout operation and is on the side of high illumination (intermediate illumination) or ultra-high illumination (high illumination) with some level of light.

6. Configuration of Camera Module

The present technology is applied not just to the solid-state imaging device. That is, the present technology is applicable to a general electronic apparatus equipped with the solid-state imaging device such as a camera module including an optical lens system or the like in addition to the solid-state imaging device, an imaging apparatus such as a digital still camera or a video camera, a mobile terminal apparatus (such as a smart phone or a tablet terminal) equipped with an imaging function, or a copier equipped with the solid-state imaging device as an image reading unit.

Figure 26:
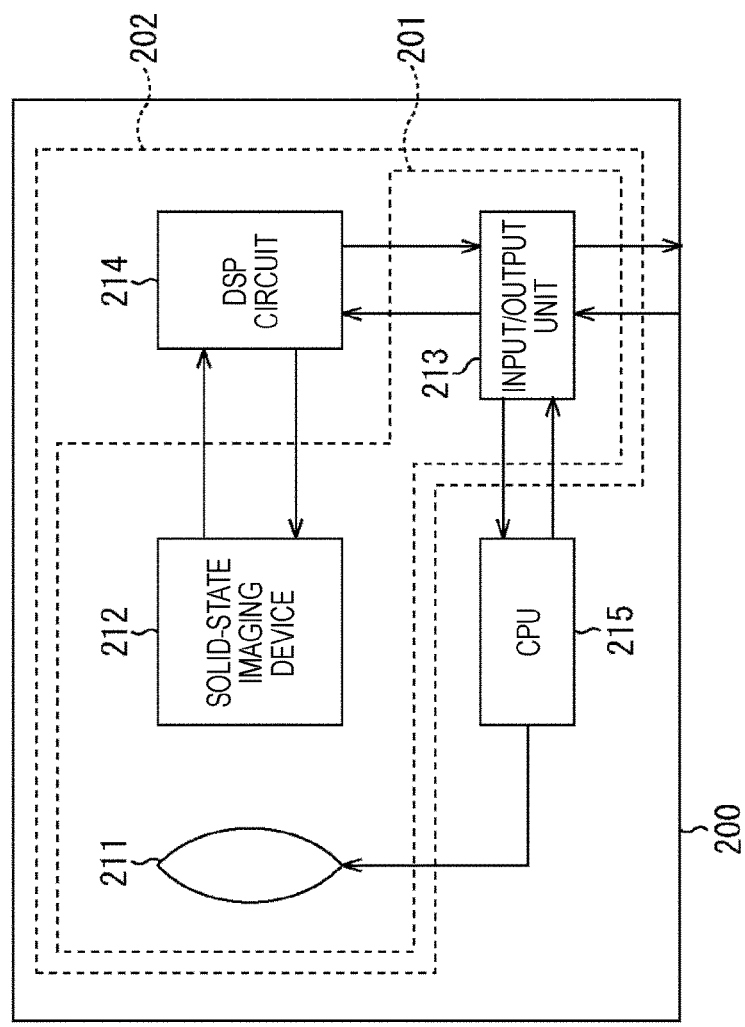
FIG. 26 is a diagram illustrating an example of the configuration of a camera module including a solid-state imaging device.

FIG. 26 is a diagram illustrating an example of the configuration of a camera module including a solid-state imaging device.

As illustrated in FIG. 26, a camera module 200 includes an optical lens system 211, a solid-state imaging device 212, an input/output unit 213, a digital signal processor (DSP) circuit 214, and a CPU 215 that are incorporated into a single module.

The solid-state imaging device 212 corresponds to the solid-state imaging device 10 of FIG. 1 and includes a pixel-column signal processing circuit as illustrated in FIG. 2 or the like, for example. That is, the solid-state imaging device 212 can switch the operating mode between a common-source readout operation and a source follower readout operation at the time of pixel readout. The solid-state imaging device 212 takes in incident light (image light) from a subject through the optical lens system 211, converts the amount of incident light forming an image on an imaging surface into an electrical signal pixel by pixel, and outputs the signal as a pixel signal.

The input/output unit 213 has a function as an input/output interface between the module and the outside. The DSP circuit 214 is a camera signal processing circuit that processes a signal supplied from the solid-state imaging device 212. The CPU 215 controls the optical lens system 211 as well as exchanges data with the input/output unit 213.

Alternatively, the module may include only the optical lens system 211, the solid-state imaging device 212, and the input/output unit 213 to serve as a camera module 201, for example. The pixel signal from the solid-state imaging device 212 is output through the input/output unit 213 in this case. Still alternatively, the module may include the optical lens system 211, the solid-state imaging device 212, the input/output unit 213, and the DSP circuit 214 to serve as a camera module 202. In this case, the pixel signal from the solid-state imaging device 212 is processed by the DSP circuit 214 and output through the input/output unit 213.

The camera modules 200, 201, and 202 are configured as described above. The camera modules 200, 201, and 202 can effectively perform pixel readout with the solid-state imaging device 212 provided in the camera modules, since the solid-state imaging device 212 can switch the operating mode between the common-source readout operation and the source follower readout operation at the time of pixel readout.

7. Configuration of Electronic Apparatus

Figure 27:
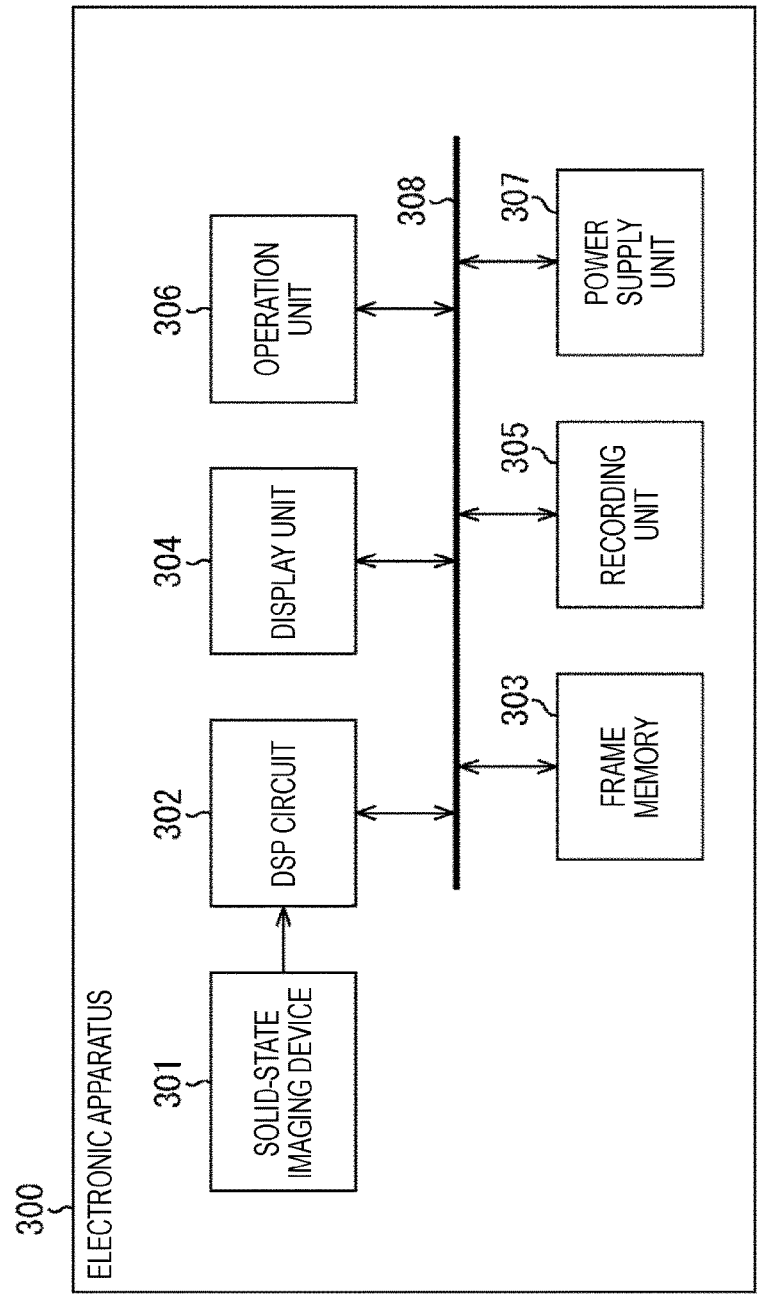
FIG. 27 is a diagram illustrating an example of the configuration of an electronic apparatus including a solid-state imaging device.

FIG. 27 is a block diagram illustrating an example of the configuration of an electronic apparatus including a solid-state imaging device.

An electronic apparatus 300 of FIG. 27 is an electronic apparatus such as an imaging apparatus including a digital still camera or a video camera, or a mobile terminal apparatus including a smart phone or a tablet terminal, for example.

As illustrated in FIG. 27, the electronic apparatus 300 includes a solid-state imaging device 301, a DSP circuit 302, a frame memory 303, a display unit 304, a recording unit 305, an operation unit 306, and a power supply unit 307. Moreover, the DSP circuit 302, the frame memory 303, the display unit 304, the recording unit 305, the operation unit 306, and the power supply unit 307 in the electronic apparatus 300 are connected to one another via a bus line 308.

The solid-state imaging device 301 corresponds to the solid-state imaging device 10 of FIG. 1 and can switch the operating mode between a common-source readout operation and a source follower readout operation at the time of pixel readout. The solid-state imaging device 301 takes in incident light (image light) from a subject through an optical lens system (not shown), converts the amount of incident light forming an image on an imaging surface into an electrical signal pixel by pixel, and outputs the signal as a pixel signal.

The DSP circuit 302 is a camera signal processing circuit that processes a signal supplied from the solid-state imaging device 301. The DSP circuit 302 outputs image data that is obtained by processing the signal from the solid-state imaging device 301. The frame memory 303 temporarily holds frame by frame the image data being processed by the DSP circuit 302.

The display unit 304 is formed of a panel display such as a liquid crystal panel or an organic electro luminescence (EL) panel, and displays a still or moving image captured by the solid-state imaging device 301. The recording unit 305 records image data of the still or moving image captured by the solid-state imaging device 301 into a recording medium such as a semiconductor memory or a hard disk.

The operation unit 306 outputs operational commands for various functions included in the electronic apparatus 300 according to an operation by a user. The power supply unit 307 supplies various power supplies for powering the DSP circuit 302, the frame memory 303, the display unit 304, the recording unit 305, and the operation unit 306 to these units as appropriate.

The electronic apparatus 300 is configured as described above. The electronic apparatus 300 can effectively perform pixel readout with the solid-state imaging device 301 provided in the electronic apparatus, since the solid-state imaging device 301 can switch the operating mode between the common-source readout operation and the source follower readout operation at the time of pixel readout.

8. Example of Use of Solid-State Imaging Device

Figure 28:
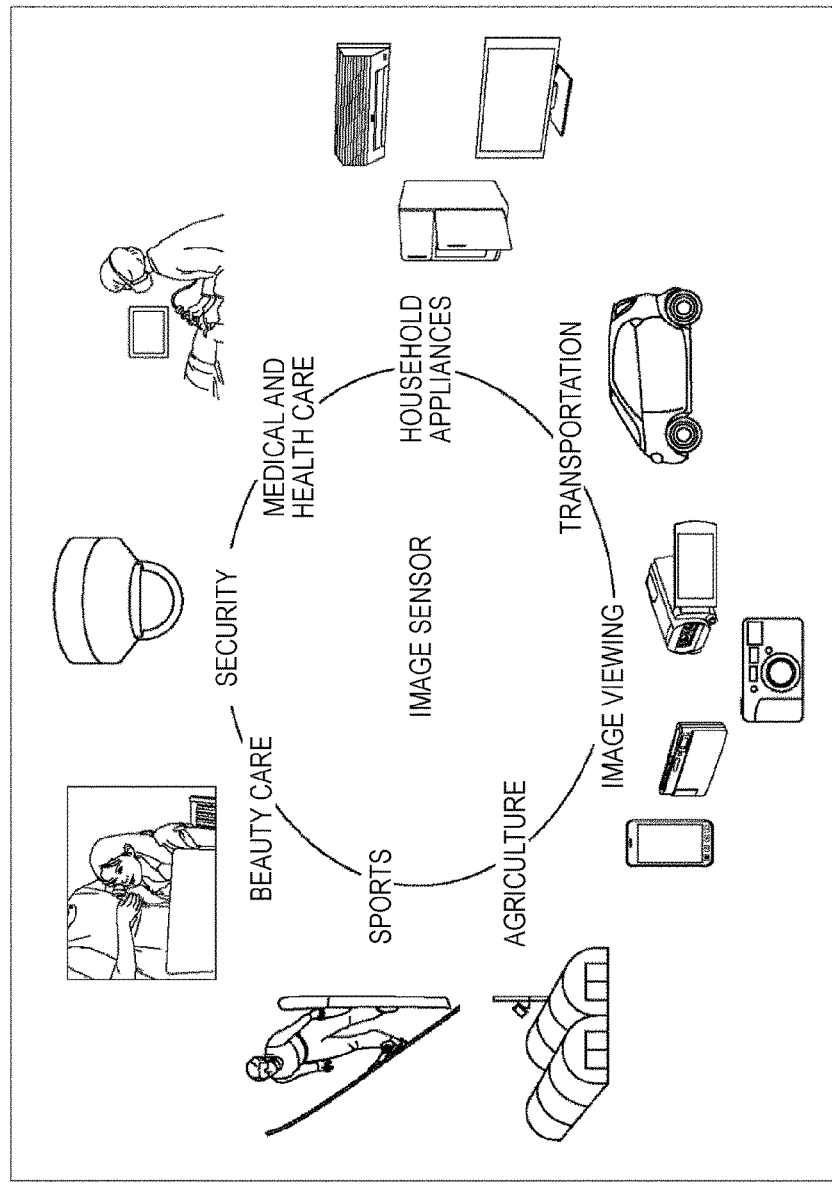
FIG. 28 is a diagram illustrating an example of use of a solid-state imaging device.

FIG. 28 is a diagram illustrating an example of use of the solid-state imaging device 10 serving as an image sensor.

The aforementioned solid-state imaging device 10 can be used in various cases of sensing light such as visible light, infrared light, ultraviolet light, or X rays as described below, for example. That is, as illustrated in FIG. 28, the solid-state imaging device 10 can be employed in an apparatus used in not only the field of image viewing, in which an image for viewing is captured, but also the fields of transportation, household appliances, medical and health care, security, beauty care, sports, or agriculture, for example.

Specifically, in the field of image viewing, the solid-state imaging device 10 can be employed in an apparatus (the electronic apparatus 300 of FIG. 27, for example) that captures an image for viewing such as a digital still camera, a smart phone, or a mobile phone equipped with a camera function as described above.

In the field of transportation, the solid-state imaging device 10 can be employed in an apparatus for use in transportation such as an on-board sensor that images the front, back, periphery, or interior of a vehicle in order to perform safe driving such as automatic stop or recognize the condition of a driver, a monitoring camera that monitors a moving vehicle or road, or a range sensor that measures the distance between vehicles, for example.

In the field of household appliances, the solid-state imaging device 10 can be employed in an apparatus for use in a home appliance such as a television receiver, a refrigerator, or an air conditioner to image a gesture of a user and operate the appliance in accordance with the gesture, for example. Moreover, in the field of medical and health care, the solid-state imaging device 10 can be employed in an apparatus for use in medical and health care such as an endoscope or an apparatus that performs angiography by receiving infrared light, for example.

In the field of security, the solid-state imaging device 10 can be employed in an apparatus for use in security such as a surveillance camera for crime prevention or a camera for authentication of a person, for example. Moreover, in the field of beauty care, the solid-state imaging device 10 can be employed in an apparatus for use in beauty care such as a skin measuring instrument that images skin or a microscope that images a scalp, for example.

In the field of sports, the solid-state imaging device 10 can be employed in an apparatus for use in sports such as an action camera or wearable camera adapted for sports, for example. Moreover, in the field of agriculture, the solid-state imaging device 10 can be employed in an apparatus for use in agriculture such as a camera that monitors the condition of the fields and crops, for example.

Note that the embodiments of the present technology are not limited to the above described embodiments but can be modified in various ways without departing from the scope of the present technology. For example, an embodiment combining all or some of the plurality of aforementioned embodiments can be adopted.

The present technology can also have the following configuration.

(1)

A solid-state imaging device including:

a plurality of pixels each including:

a photoelectric transducer that generates an electric charge according to an amount of incident light and accumulates the electric charge inside;

one or a plurality of transfer gates that transfers the electric charge accumulated in the photoelectric transducer; and a floating diffusion region that holds the electric charge transferred by the transfer gates in order for the electric charge to be read as a signal; and a readout unit that performs a common-source operation or a source follower operation with respect to the plurality of pixels to read a signal for each column, in which the readout unit performs, according to a level of illumination:

a common-source readout operation to reset the floating diffusion region and read the electric charge transferred from the photoelectric transducer and held in the floating diffusion region; and a source follower readout operation to reset the floating diffusion region and read the electric charge transferred from the photoelectric transducer and held in the floating diffusion region.

(2)

The solid-state imaging device according to (1), further including:

an analog/digital (A/D) converter that performs A/D conversion on an analog pixel signal read by the common-source readout operation or the source follower readout operation to obtain a digital signal; and an inverting amplifier that is provided upstream of the A/D converter and operated at the time of the common-source readout operation, in which
the inverting amplifier is operated to:
shift a voltage range of the common-source readout operation in accordance with a voltage range of the source follower readout operation to align a reset level of the common-source readout operation with a reset level of the source follower readout operation; and
invert output of the common-source readout operation to align a signal of the common-source readout operation and a signal of the source follower readout operation in the same direction, the signals being input to the A/D converter.

(3)
The solid-state imaging device according to (1) or (2), further including:
a control unit that switches an operating mode to the common-source readout operation in a case where the level of illumination of a subject is lower than predetermined illumination, or to the source follower readout operation in a case where the level of illumination of the subject is higher than or equal to the predetermined illumination, on the basis of a frame acquired temporally before a current frame.

(4)
The solid-state imaging device according to (1) or (2), in which
the plurality of pixels arranged in two dimensions is read in an operating mode that is switched alternately and successively between the common-source readout operation and the source follower readout operation in a horizontal direction.

(5)
The solid-state imaging device according to (1) or (2), in which
the plurality of pixels arranged in two dimensions is read in an operating mode that is switched alternately and successively between the common-source readout operation and the source follower readout operation frame by frame.

(6)
The solid-state imaging device according to (1) or (2), in which
the plurality of pixels arranged in two dimensions is read in an operating mode that is switched alternately and successively between the common-source readout operation and the source follower readout operation in horizontal and vertical directions.

(7)
The solid-state imaging device according to (2), in which
the A/D converter adaptively switches an operating mode to the common-source readout operation in a case where the level of illumination of a subject is lower than predetermined illumination, or to the source follower readout operation in a case where the level of illumination of the subject is higher than or equal to the predetermined illumination, on the basis of output from the readout unit.

(8)
The solid-state imaging device according to (7), in which
the A/D converter switches the operating mode in a way that:
an auto zero (AZ) period is completed first;
a reset level of the common-source readout operation is acquired;
a reset level of the source follower readout operation is acquired;
the electric charge is transferred from the photoelectric transducer to the floating diffusion region by the transfer gates; and
a signal level of the common-source readout operation or a signal level of the source follower readout operation is acquired according to a result of determination on a signal level.

(9)
The solid-state imaging device according to (7), in which
the A/D converter switches the operating mode in a way that:
an AZ period is completed first;
a reset level of the common-source readout operation is acquired;
the electric charge is transferred from the photoelectric transducer to the floating diffusion region by the transfer gates;
a signal level of the common-source readout operation or a signal level of the source follower readout operation is acquired according to a result of determination on a signal level; and
a reset level of the source follower readout operation is acquired.

(10)
The solid-state imaging device according to (1) or (2), in which
each of the plurality of pixels further includes a lateral overflow integration capacitor that can accumulate the electric charge generated by the photoelectric transducer as well as reduce conversion efficiency, and
the readout unit performs a lateral overflow integration capacitor (LOFIC) readout operation using the lateral overflow integration capacitor on the plurality of pixels to read a signal for each column.

(11)
The solid-state imaging device according to (10), in which
the plurality of pixels arranged in two dimensions is read in an operating mode that is switched alternately and successively among the common-source readout operation, the source follower readout operation, and the LOFIC readout operation in a horizontal direction or frame by frame.

(12)
The solid-state imaging device according to (10), in which
the A/D converter adaptively switches an operating mode to the common-source readout operation, the source follower readout operation, or the LOFIC readout operation according to the level of illumination of a subject on the basis of output from the readout unit.

(13)
The solid-state imaging device according to (12), in which
the A/D converter switches the operating mode in a way that:
an AZ period is completed first;
a reset level of the LOFIC readout operation is acquired;
a reset level of the source follower readout operation is acquired;
a reset level of the common-source readout operation is acquired;
the electric charge is transferred from the photoelectric transducer to the floating diffusion region by the transfer gates; and
a signal level of the common-source readout operation, a signal level of the source follower readout operation, or a signal level of the LOFIC readout operation is acquired according to a result of determination on a signal level.

(14)

The solid-state imaging device according to (12), in which the A/D converter switches the operating mode in a way that:

an AZ period is completed first;

a reset level of the common-source readout operation is acquired;

the electric charge is transferred from the photoelectric transducer to the floating diffusion region by the transfer gates;

a signal level of the common-source readout operation, a signal level of the source follower readout operation, or a signal level of the LOFIC readout operation is acquired according to a result of determination on a signal level; and a reset level of the source follower readout operation or a reset level of the LOFIC readout operation is acquired according to a result of determination on a signal level.

(15)

A method of driving a solid-state imaging device including:

a plurality of pixels each including:

a photoelectric transducer that generates an electric charge according to an amount of incident light and accumulates the electric charge inside;

one or a plurality of transfer gates that transfers the electric charge accumulated in the photoelectric transducer; and a floating diffusion region that holds the electric charge transferred by the transfer gates in order for the electric charge to be read as a signal; and a readout unit that performs a common-source operation or a source follower operation with respect to the plurality of pixels to read a signal for each column, in which the method includes a step in which the readout unit performs, according to a level of illumination:

a common-source readout operation to reset the floating diffusion region and read the electric charge transferred from the photoelectric transducer and held in the floating diffusion region; and a source follower readout operation to reset the floating diffusion region and read the electric charge transferred from the photoelectric transducer and held in the floating diffusion region.

(16)

An electronic apparatus equipped with a solid-state imaging device including:

a plurality of pixels each including:

a photoelectric transducer that generates an electric charge according to an amount of incident light and accumulates the electric charge inside;

one or a plurality of transfer gates that transfers the electric charge accumulated in the photoelectric transducer; and a floating diffusion region that holds the electric charge transferred by the transfer gates in order for the electric charge to be read as a signal; and a readout unit that performs a common-source operation or a source follower operation with respect to the plurality of pixels to read a signal for each column, in which the readout unit performs, according to a level of illumination:

a common-source readout operation to reset the floating diffusion region and read the electric charge transferred from the photoelectric transducer and held in the floating diffusion region; and a source follower readout operation to reset the floating diffusion region and read the electric charge transferred from the photoelectric transducer and held in the floating diffusion region.

REFERENCE SIGNS LIST

10 Solid-state imaging device
21 Pixel array unit
31 Pixel
23 Column signal processing circuit
26 Control circuit
51 Photodiode (PD)
52 Transfer transistor
53 Reset transistor
54 Amplifying transistor
55 Selection transistor
56 Floating diffusion region (FD)
71, 72, 73, 74, 79 Switch
75, 76 Current source
77 Inverting amplifier circuit
78 A/D converter circuit
91 Comparator
101, 102 LOFIC transistor
103 LOFIC capacitor
111 MUX
200, 201, 202 Camera module
212 Solid-state imaging device
300 Electronic apparatus
301 Solid-state imaging device

What is claimed is:

1. A solid-state imaging device comprising:

a plurality of pixels each including:

a photoelectric transducer that generates an electric charge according to an amount of incident light and accumulates the electric charge inside;

one or a plurality of transfer gates that transfers the electric charge accumulated in the photoelectric transducer; and a floating diffusion region that holds the electric charge transferred by the transfer gates in order for the electric charge to be read as a signal; and a readout unit that performs a common-source operation or a source follower operation with respect to the plurality of pixels to read a signal for each column, wherein the readout unit performs, according to a level of illumination:

a common-source readout operation to reset the floating diffusion region and read the electric charge transferred from the photoelectric transducer and held in the floating diffusion region; and a source follower readout operation to reset the floating diffusion region and read the electric charge transferred from the photoelectric transducer and held in the floating diffusion region;

an analog/digital (A/D) converter that performs A/D conversion on an analog pixel signal read by the common-source readout operation or the source follower readout operation to obtain a digital signal; and an inverting amplifier that is provided upstream of the A/D converter and operated at the time of the common-source readout operation, wherein the inverting amplifier is operated to:

shift a voltage range of the common-source readout operation in accordance with a voltage range of the source follower readout operation to align a reset level of the common-source readout operation with a reset level of the source follower readout operation; and invert output of the common-source readout operation to align a signal of the common-source readout operation and a signal of the source follower readout operation in the same direction, the signals being input to the A/D converter.

2. The solid-state imaging device according to claim 1, further comprising:

a control unit that switches an operating mode to the common-source readout operation in a case where the level of illumination of a subject is lower than a predetermined illumination, or to the source follower readout operation in a case where the level of illumination of the subject is higher than or equal to the predetermined illumination, on the basis of a frame acquired temporally before a current frame.

3. The solid-state imaging device according to claim 1, wherein the plurality of pixels is arranged in two dimensions and is read in an operating mode that is switched alternately and successively between the common-source readout operation and the source follower readout operation in a horizontal direction.

4. The solid-state imaging device according to claim 1, wherein the plurality of pixels is arranged in two dimensions and is read in an operating mode that is switched alternately and successively between the common-source readout operation and the source follower readout operation frame by frame.

5. The solid-state imaging device according to claim 1, wherein the plurality of pixels is arranged in two dimensions and is read in an operating mode that is switched alternately and successively between the common-source readout operation and the source follower readout operation in horizontal and vertical directions.

6. The solid-state imaging device according to claim 1, wherein the A/D converter adaptively switches an operating mode to the common-source readout operation in a case where the level of illumination of a subject is lower than a predetermined illumination, or to the source follower readout operation in a case where the level of illumination of the subject is higher than or equal to the predetermined illumination, on the basis of output from the readout unit.

7. The solid-state imaging device according to claim 6, wherein
the A/D converter switches the operating mode in a way that:
an auto zero (AZ) period is completed first;
a reset level of the common-source readout operation is acquired;
a reset level of the source follower readout operation is acquired;
the electric charge is transferred from the photoelectric transducer to the floating diffusion region by the transfer gates; and
a signal level of the common-source readout operation or a signal level of the source follower readout operation is acquired according to a result of determination on a signal level.

8. The solid-state imaging device according to claim 6, wherein
the A/D converter switches the operating mode in a way that:
an auto zero (AZ) period is completed first;
a reset level of the common-source readout operation is acquired;

the electric charge is transferred from the photoelectric transducer to the floating diffusion region by the transfer gates;
a signal level of the common-source readout operation or a signal level of the source follower readout operation is acquired according to a result of determination on a signal level; and
a reset level of the source follower readout operation is acquired.

9. The solid-state imaging device according to claim 1, wherein
each of the plurality of pixels further comprises a lateral overflow integration capacitor that can accumulate the electric charge generated by the photoelectric transducer as well as reduce conversion efficiency, and
the readout unit performs a lateral overflow integration capacitor (LOFIC) readout operation using the lateral overflow integration capacitor on the plurality of pixels to read a signal for each column.

10. The solid-state imaging device according to claim 9, wherein the plurality of pixels is arranged in two dimensions and is read in an operating mode that is switched alternately and successively among the common-source readout operation, the source follower readout operation, and the LOFIC readout operation in a horizontal direction or frame by frame.

11. The solid-state imaging device according to claim 9, wherein the A/D converter adaptively switches an operating mode to the common-source readout operation, the source follower readout operation, or the LOFIC readout operation according to the level of illumination of a subject on the basis of output from the readout unit.

12. The solid-state imaging device according to claim 11, wherein
the A/D converter switches the operating mode in a way that:
an auto zero (AZ) period is completed first;
a reset level of the LOFIC readout operation is acquired;
a reset level of the source follower readout operation is acquired;
a reset level of the common-source readout operation is acquired;
the electric charge is transferred from the photoelectric transducer to the floating diffusion region by the transfer gates; and
a signal level of the common-source readout operation, a signal level of the source follower readout operation, or a signal level of the LOFIC readout operation is acquired according to a result of determination on a signal level.

13. The solid-state imaging device according to claim 11, wherein
the A/D converter switches the operating mode in a way that:
an auto zero (AZ) period is completed first;
a reset level of the common-source readout operation is acquired;
the electric charge is transferred from the photoelectric transducer to the floating diffusion region by the transfer gates;
a signal level of the common-source readout operation, a signal level of the source follower readout operation, or a signal level of the LOFIC readout operation is acquired according to a result of determination on a signal level; and a reset level of the source follower readout operation or a reset level of the LOFIC readout operation is acquired according to a result of determination on a signal level.

14. A method of driving a solid-state imaging device comprising:
a plurality of pixels each including:
a photoelectric transducer that generates an electric charge according to an amount of incident light and accumulates the electric charge inside;
one or a plurality of transfer gates that transfers the electric charge accumulated in the photoelectric transducer; and
a floating diffusion region that holds the electric charge transferred by the transfer gates in order for the electric charge to be read as a signal; and
a readout unit that performs a common-source operation or a source follower operation with respect to the plurality of pixels to read a signal for each column, wherein
the method includes a step in which the readout unit performs, according to a level of illumination:
a common-source readout operation to reset the floating diffusion region and read the electric charge transferred from the photoelectric transducer and held in the floating diffusion region; and
a source follower readout operation to reset the floating diffusion region and read the electric charge transferred from the photoelectric transducer and held in the floating diffusion region; the solid-state imaging device further comprising:
an analog/digital (A/D) converter that performs A/D conversion on an analog pixel signal read by the common-source readout operation or the source follower readout operation to obtain a digital signal; and
an inverting amplifier that is provided upstream of the A/D converter and operated at the time of the common-source readout operation, wherein the inverting amplifier is operated to:
shift a voltage range of the common-source readout operation in accordance with a voltage range of the source follower readout operation to align a reset level of the common-source readout operation with a reset level of the source follower readout operation; and
invert output of the common-source readout operation to align a signal of the common-source readout operation and a signal of the source follower readout operation in the same direction, the signals being input to the A/D converter.

15. An electronic apparatus equipped with a solid-state imaging device comprising:
a plurality of pixels each including:
a photoelectric transducer that generates an electric charge according to an amount of incident light and accumulates the electric charge inside;
one or a plurality of transfer gates that transfers the electric charge accumulated in the photoelectric transducer; and
a floating diffusion region that holds the electric charge transferred by the transfer gates in order for the electric charge to be read as a signal;
a readout unit that performs a common-source operation or a source follower operation with respect to the plurality of pixels to read a signal for each column, wherein the readout unit performs, according to a level of illumination:
a common-source readout operation to reset the floating diffusion region and read the electric charge transferred from the photoelectric transducer and held in the floating diffusion region; and
a source follower readout operation to reset the floating diffusion region and read the electric charge transferred from the photoelectric transducer and held in the floating diffusion region;
an analog/digital (A/D) converter that performs A/D conversion on an analog pixel signal read by the common-source readout operation or the source follower readout operation to obtain a digital signal; and
an inverting amplifier that is provided upstream of the A/D converter and operated at the time of the common-source readout operation, wherein the inverting amplifier is operated to:
shift a voltage range of the common-source readout operation in accordance with a voltage range of the source follower readout operation to align a reset level of the common-source readout operation with a reset level of the source follower readout operation; and
invert output of the common-source readout operation to align a signal of the common-source readout operation and a signal of the source follower readout operation in the same direction, the signals being input to the A/D converter.

* * * * *